(12) United States Patent
Kinder et al.

(10) Patent No.: US 12,744,677 B1
(45) Date of Patent: Sep. 22, 2026

(54) SYSTEMS AND METHODS FOR ATTESTED LOCATION-BASED AUTHENTICATION

(71) Applicant: Nametag Inc., Seattle, WA (US)

(72) Inventors: Ross Kinder, Ann Arbor, MI (US); Ben Fenwick, Papillion, NE (US); Andrew Catellier, Denver, NE (US)

(73) Assignee: Nametag Inc., Seattle, WA (US)

( * ) Notice: Subject to any disclaimer, the term of this patent is extended or adjusted under 35 U.S.C. 154(b) by 0 days.

(21) Appl. No.: 19/386,920

(22) Filed: Nov. 12, 2025

(51) Int. Cl.
*H04W 12/63* (2021.01)
*H04L 9/32* (2006.01)

(52) U.S. Cl.
CPC .......... *H04L 9/3247* (2013.01); *H04W 12/63* (2021.01)

(58) Field of Classification Search
CPC ............................ H04L 9/3247; H04W 12/63
See application file for complete search history.

(56) References Cited

U.S. PATENT DOCUMENTS 9,674,173 B2 * 6/2017 Fox .................... H04L 63/0823
10,841,316 B2 * 11/2020 Innes ................. H04L 63/0823
2019/0289017 A1 * 9/2019 Agarwal .............. H04L 9/0643

* cited by examiner

*Primary Examiner* — Amie C. Lin
(74) *Attorney, Agent, or Firm* — Foley & Lardner LLP

(57) ABSTRACT

Systems and methods for authenticating a user include an application executing on a device which receives, from an authentication server associated with the application, a request to authenticate a user. The application can obtain user authentication information from the user. Responsive to a signal transmitted to a native operating system service on the device, the application can receive current location data from a location sensor of the device. The application can invoke an attestation service of the operating system to obtain device integrity data indicative of one or more operational components of the device. The application can generate a data packet including the user authentication information, the location data, and a digital signature generated by the attestation service, the digital signature corresponding to the location data and the device integrity data, and transmit to the authentication server a response including the data packet.

20 Claims, 6 Drawing Sheets

SYSTEMS AND METHODS FOR ATTESTED LOCATION-BASED AUTHENTICATION

INTRODUCTION

Remote access control can regulate user interactions with networked resources across computing devices. Contextual signals such as geospatial information, proximity data, and device state may be combined with credentials to inform authentication decisions. However, providing reliable and tamper-resistant context for authentication across diverse platforms and network conditions is challenging.

SUMMARY

Remote access control can rely on contextual signals gathered from heterogeneous computing platforms, yet conventional data flows often lack binding between reported context and device integrity. Reported location can be spoofed by developer mock providers, emulators, rooted or jailbroken operating systems, or network relays such as virtual private networks, thereby creating uncertainty for any geofence policy or jurisdiction rule. Many workflows can deliver location values without a trusted timestamp or a provenance indicator from a platform attestation authority, which can leave the capture time and execution state ambiguous. Cross-platform deployments can depend on divergent application programming interfaces (APIs) and sensor behaviors, producing inconsistent evidence across operating systems. Unattested proximity readings from short-range radios can introduce additional ambiguity regarding physical presence near another device or a fixed transmitter. In some implementations, server-side authentication pipelines can further lack a consistent packet structure, such that verification logic can vary by device family and firmware level, for example by relying on ad hoc headers or metadata.

The techniques described herein can establish a protocol in which an application on a device interacts with native operating system (OS) services to collect context and obtain a hardware-rooted attestation over selected fields. The application can request location from a location service, obtain device integrity data from an attestation service, and assemble a canonical packet that can include user authentication information, the location, the integrity data, and a system timestamp. The attestation service can generate a digital signature across the packet or a defined subset of packet fields, and the application can transmit the signed packet to an authentication server for verification using a cryptographic key associated with the device or the attestation service. In some implementations, the packet can further include proximity information obtained via Bluetooth wireless personal area network, Wi-Fi wireless local area network, or near-field communication, such that policy engines can evaluate co-location requirements. In some implementations, the location service can aggregate signals from global positioning system receivers or other sensors to supply coordinates suited for policy evaluation.

At least one aspect relates to a method. The method can be performed, for example, by one or more processors coupled to non-transitory memory. The method can include receiving, at an application executing on a device and from an authentication server associated with the application, a request to authenticate a user. The method can include obtaining user authentication information from the user. The method can include receiving current location data from a location sensor of the device responsive to a signal transmitted to a native operating system service on the device. The method can include invoking an attestation service of the operating system on the device to obtain device integrity data indicative of one or more operational components of the device. The method can include generating a data packet including the user authentication information and a digital signature generated by the attestation service, the digital signature corresponding to the location data and the device integrity data. The method can include transmitting to the authentication server a response comprising the data packet inclusive of the user authentication information and the digital signature.

In some implementations, the device integrity data can include at least one of an indication of a device debug or mock mode status, an indication of whether the application was installed via a designated application store, or an indication of a hardware or operating system modification. In some implementations, the signal transmitted to the native operating system service can include a first native API call to a location service of the device, and the attestation service of the operating system can be invoked via a second native API call. In some implementations, the method can include rendering a prompt to obtain consent to share the current location data, and the application can receive the current location data responsive to obtaining consent via the prompt. In some implementations, the digital signature can attest to the current location data, the device integrity data, and the user authentication information. In some implementations, the data packet can further include a timestamp generated by the operating system indicating when the location data was obtained. In some implementations, the current location data can be obtained from at least one of a global positioning system sensor, a wireless personal area network transceiver, a wireless local area network transceiver, or a near-field communication transceiver. In some implementations, the method can include receiving, via the wireless personal area network transceiver, wireless local area network transceiver, or near-field communication transceiver, a signal from a paired device indicating proximity information of the device relative to the paired device. In some implementations, the data packet can further include the proximity information. In some implementations, the paired device can include at least one of a mobile phone, a tablet, or a wearable device.

At least one other aspect relates to a system. The system can transmit, to an application executing on a device, a request to authenticate a user. The system can receive, from the application, a data packet comprising user authentication information obtained from the user via the application, location data obtained from a location sensor of the device responsive to a signal transmitted to a native operating system service of the device, device integrity data obtained responsive to invoking an attestation service of the native operating system, and a digital signature generated by the attestation service corresponding to the location data and the device integrity data. The system can verify the digital signature using a cryptographic key associated with the attestation service or the device. The system can determine an authentication status of the user based on the location data, the verified digital signature, and the user authentication information.

In some implementations, the system can obtain the cryptographic key from at least one of the device or public key storage. In some implementations, the system can determine the authentication status based on the location data indicating a current location of the device within a geographic region associated with the user authentication information.

At least one other aspect relates to a non-transitory computer-readable medium. The non-transitory computer-readable medium can store instructions that, when executed by one or more processors, cause the one or more processors to execute an application on a device to receive, from an authentication server associated with the application, a request to authenticate a user. The instructions can cause the application to obtain user authentication information from the user. The instructions can cause the application to receive, responsive to a signal transmitted to a native operating system service on the device, current location data from a location sensor of the device. The instructions can cause the application to invoke an attestation service of the operating system on the device to obtain device integrity data indicative of one or more operational components of the device. The instructions can cause the application to generate a data packet including the user authentication information and a digital signature generated by the attestation service, the digital signature corresponding to the location data and the device integrity data. The instructions can cause the application to transmit, via a transceiver to the authentication server, a response comprising the data packet inclusive of the user authentication information and the digital signature.

In some implementations, the device integrity data can include at least one of an indication of a device debug or mock mode status, an indication of whether the application was installed via a designated application store, or an indication of a hardware or operating system modification. In some implementations, the signal transmitted to the native operating system service can include a first native API call to a location service of the device, and the attestation service of the operating system can be invoked via a second native API call. In some implementations, the instructions can cause the application to render a prompt to obtain consent to share the current location data, and the application can receive the current location data responsive to obtaining consent via the prompt. In some implementations, the digital signature can attest to the current location data, the device integrity data, and the user authentication information. In some implementations, the data packet can further include a timestamp generated by the operating system indicating when the location data was obtained. In some implementations, the current location data can be obtained from at least one of a global positioning system sensor, a wireless personal area network transceiver, a wireless local area network transceiver, or a near-field communication transceiver. In some implementations, the instructions can cause the application to receive, via the wireless personal area network transceiver, wireless local area network transceiver, or near-field communication transceiver, a signal from a paired device indicating proximity information of the device relative to the paired device, and the data packet can further include the proximity information.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
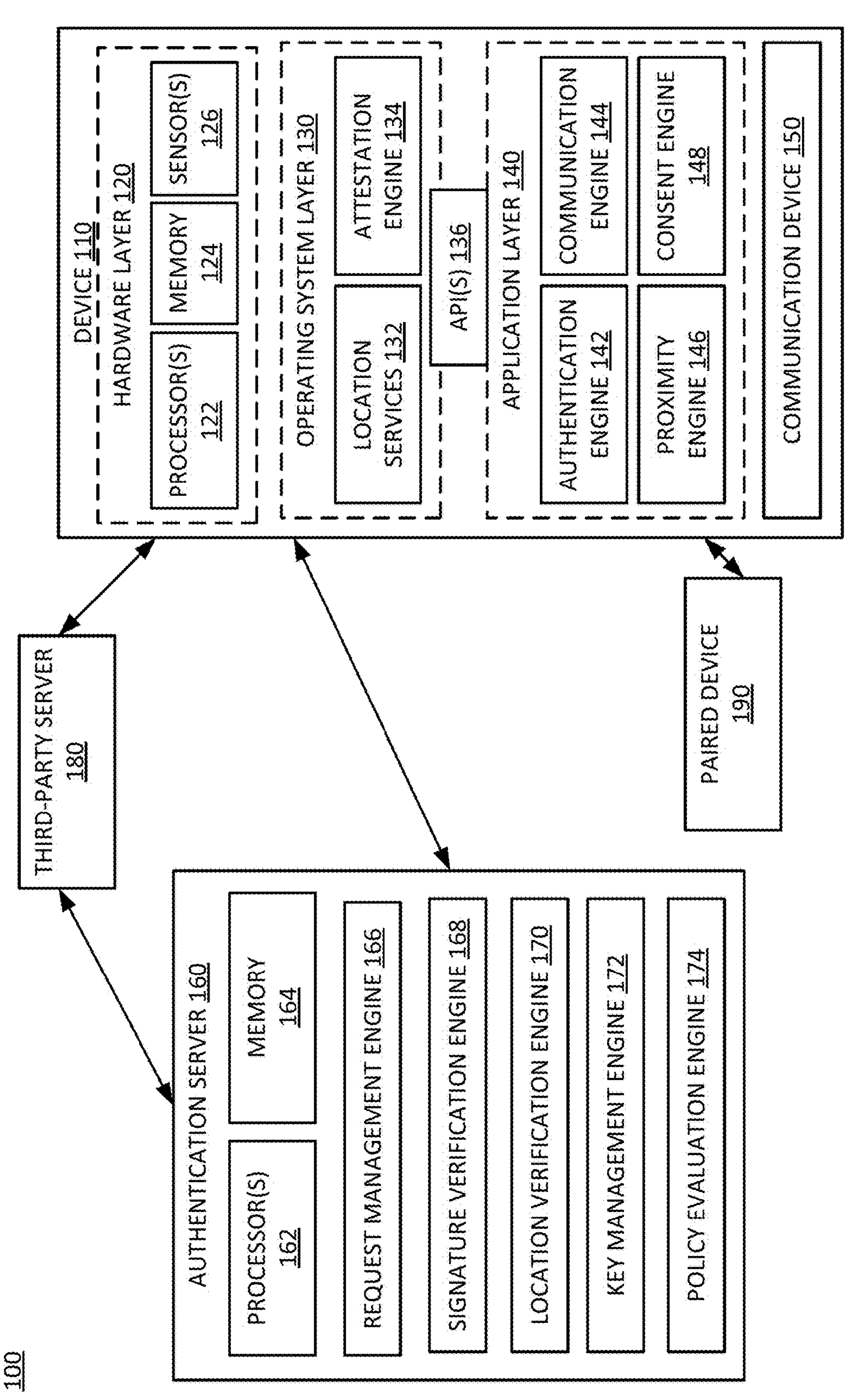
FIG. 1 is a block diagram illustrating a system for attested location-based authentication, in accordance with one or more implementations.

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

This disclosure relates to techniques for remote access control that can use attested geospatial context during authentication. A computing environment can include a user device with sensors and secure hardware, an operating system with location and attestation services, and an application that can interact with such services. An authentication server can coordinate exchanges with the application to evaluate user credentials in combination with device-sourced context. A third-party server can request authentication for access to a protected resource. In some implementations, short-range radios, such as wireless personal area network (e.g., BLUETOOTH) transceivers, wireless local area network (e.g., WI-FI) transceivers, or near-field communication transceivers can provide proximity information that the authentication server can evaluate.

Some approaches to contextual authentication can face several technical challenges. For example, a reported location can be spoofed by developer mock providers, emulators, rooted or jailbroken operating systems, or network relays such as virtual private networks, such that geofence evaluation can be unreliable. Context often lacks a trusted timestamp or provenance from an attestation authority, such that capture time or execution state can be ambiguous. Additionally, cross-platform deployments can expose divergent application programming interfaces and sensor behaviors, such that evidence can be inconsistent across devices. Further, proximity readings without attestation can be injected or replayed. Server pipelines can vary in packet structure, such that verification logic can be fragile across device families and firmware levels.

The techniques described herein can provide an authentication solution that binds location and device integrity to a hardware-rooted attestation. An application on a user device can obtain location data from a native operating system service, obtain device integrity data from an attestation service, and assemble a packet that includes user authentication information, the location data, the integrity data, and a timestamp. The attestation service can generate a digital signature across selected fields such that provenance is tied to a device key or an attestation authority. The authentication server can verify the signature and apply a policy based on the attested fields. In some implementations, proximity information can be included for scenarios that require co-location.

In one high-level implementation, a user device can include an application layer with an authentication engine, a consent engine, a location engine, an attestation engine, a proximity engine, and a communication engine. The operating system can expose location services and an attestation engine through native application programming interfaces. The authentication server can include a request management engine, a signature verification engine, a location verification engine, a policy evaluation engine, and a key management engine. A third-party server can initiate an authentication request to the authentication server. The authentication server can transmit a challenge to the application. The application can prompt the user for credentials and can render a consent dialog for location access. Upon consent, the location engine can call the operating system location service to obtain coordinates. The attestation engine can invoke the operating system attestation service to obtain device integrity data and a signature that corresponds to selected packet fields and a system timestamp. The communication engine can transmit the signed packet to the authentication server. The signature verification engine can validate the signature using a cryptographic key from the device or from public key storage. The policy evaluation engine can evaluate the attested fields and can return an authentication status to the third-party server.

The techniques described herein can address the challenges identified above. Binding location and integrity into a signed packet can reduce susceptibility to mock providers, emulators, rooted operating systems, and virtual private networks, such that location-based policy evaluation can be more reliable. A server-verified digital signature with a trusted timestamp can provide provenance for capture time and execution state. A canonical packet structure and native application programming interface usage can provide consistent evidence across platforms. In some instances, proximity signals that are included in the attested packet can provide a mechanism for physical presence validation. The techniques can therefore provide technical improvements to remote access control by supplying verifiable context that an authentication server can evaluate using deterministic cryptographic checks and policy logic.

Referring now to FIG. 1, illustrated is a block diagram of a system 100 for attested location-based authentication. The system 100 can include a device 110, an authentication server 160, a third-party server 180, and a paired device 190. As described in greater detail below, The authentication server 160 can transmit to the device 110 a request to authenticate a user. The device 110 can execute an application that receives the request from the authentication server 160, obtains user authentication information from the user, acquires current location data from a native operating system service, invokes an attestation service to obtain device integrity data, and generates a data packet that includes a digital signature corresponding to the location data and the device integrity data. In some implementations, the device 110 can include in the data packet an operating-system-generated timestamp indicating when the location data was obtained and proximity information derived from signals exchanged with the paired device 190 via wireless personal area network, wireless local area network, and/or near-field communication. For example, the device 110 can receive a BLUETOOTH or near-field communication signal from the paired device 190 that indicates proximity information and incorporate the proximity information into the data packet for evaluation. The authentication server 160 can receive the data packet in a response, verify a digital signature included in the data packet using a cryptographic key associated with an attestation service or the device 110, and determine an authentication status based on verified packet contents and the user authentication information. In some implementations, the third-party server 180 4 can initiate an authentication transaction by sending a request to the authentication server 160 and can receive the authentication status after the authentication server 160 completes verification and evaluation.

The system 100 can include a device 110 that executes an application to perform location-attested authentication workflows. The device 110 can be a mobile computing platform such as a smartphone, a tablet, a wearable, or a laptop with a cellular or wireless personal area network interface, among others. In some implementations, the device 110 can be a dedicated handheld used for workforce tasks or checkpoint verification. For example, the device 110 can obtain location data via native operating system services, request device attestation, assemble a canonical payload, and transmit the payload to an authentication server 160 via a communication device 150. The device 110 can process such operations using processor(s) 122 and store transient fields in memory 124. In some implementations, the device 110 can exchange proximity signals with a paired device 190 before payload generation.

The device 110 may be organized in layers that separate sensing and hardware operations, operating system services, and application logic. The device 110 can include a hardware layer 120 that provides processor(s) 122, memory 124, and sensor(s) 126 used for location and proximity acquisition. The device 110 can include an operating system layer 130 that exposes location services 132 and an attestation engine 134 through API(s) 136 to mediate access to sensor(s) 126 and to generate attestation outputs. In some implementations, the device 110 can include an application layer 140 that orchestrates user input via an authentication engine 142, prepares and transmits packets via a communication engine 144, acquires proximity information via a proximity engine 146, and obtains consent via a consent engine 148. For example, the application layer 140 of the device 110 can serialize fields into a deterministic structure and request a hardware-rooted signature from the attestation engine 134 prior to transmission via the communication device 150. The layered arrangement of the device 110 can delineate responsibilities so that sensing occurs in the hardware layer 120, mediation and attestation occur in the operating system layer 130, and packet assembly and transmission occur in the application layer 140.

The device 110 can include a hardware layer 120 that provides compute and sensing interfaces to higher layers (such as the operating system layer 130 and application layer 140 described above). The hardware layer 120 can include or otherwise provide processor(s) 122, memory 124, and sensor interfaces for use by the operating system layer 130 and the application layer 140. In some implementations, the hardware layer 120 can expose sensor(s) 126 that include a global positioning system (GPS) receiver, a wireless personal area network (WPAN) transceiver, a wireless local area network (WLAN) transceiver, and/or a near-field communication (NFC) interface. For example, sensor(s) 126 can determine, detect, or otherwise identify a latitude and longitude from the global positioning system receiver and proximity parameters obtained via the WPAN/WLAN transceiver and/or NFC interface, among others. In some embodiments, the hardware layer 120 can supply execution resources used during cryptographic operations and sensor data acquisition invoked by the application layer 140. In some implementations, a secure element in the hardware layer 120 may implement, provide, or otherwise configure keys used by an operating system attestation service to generate signatures over attested data. The hardware layer 120 can couple to the operating system layer 130 through device drivers that deliver timestamped measurements to higher layers. For example, measurements from sensor(s) 126 can be surfaced with an operating-system-generated acquisition time that the application layer 140 later places in a packet.

The hardware layer 120 can include processor(s) 122. The processor(s) 122 can be one or more general-purpose central processing units that execute program instructions and arithmetic operations. In some implementations, the processor(s) 122 can be heterogeneous processing units such as graphics processing units, digital signal processors, and/or neural processing units, among others. For example, the processor(s) 122 can include multicore architectures that provide scalar cores and vector execution units operating at different clock frequencies. The processor(s) 122 can implement 32-bit and/or 64-bit instruction set architectures such as ARM, x86, and/or RISC-V, among others. In some implementations, the processor(s) 122 can be integrated in a system-on-chip with memory controllers and I/O interfaces, or can be discrete packages on a circuit board. For example, the processor(s) 122 can include big-LITTLE style cores for power-performance tradeoffs and auxiliary controllers for sensor and radio coordination. The hardware layer 120 can include memory 124 that provides addressable storage for program code and data used during authentication workflows. Memory 124 can include volatile and non-volatile arrays that operate under the processor(s) 122. In some implementations, memory 124 can be dynamic random-access memory or static random-access memory used for transient buffers and working sets. For example, memory 124 can retain executable instructions, transient packet fields, sensor readings, and operating system timestamps until transmission. In some implementations, memory 124 can include non-volatile storage such as NAND flash, NOR flash, or read-only memory, among others.

The hardware layer 120 can include sensor(s) 126 that provide measurements used to identify, determine, or otherwise derive device location and proximity information for delivery to the operating system layer 130. The sensor(s) 126 can generate readings that the operating system layer 130 can expose via API(s) 136 in response to a signal from application logic. In some implementations, the operating system layer 130 can combine, multiplex, or otherwise fuse measurements from multiple elements of the sensor(s) 126 to produce coordinates and a system timestamp. For example, the operating system layer 130 can return latitude and longitude with an operating-system-generated acquisition time for placement in higher-layer data structures. The sensor(s) 126 can further exchange short-range signals with a paired device 190 to provide proximity indicators used for co-location evaluation.

In some implementations, the sensor(s) 126 can include a global navigation receiver that acquires satellite-based fixes for absolute positioning. In some implementations, the operating system layer 130 can query the global navigation receiver of the sensor(s) 126 via API(s) 136 to obtain latitude, longitude, and/or altitude with an associated accuracy parameter. For example, the operating system layer 130 can supply a single-shot fix that includes coordinates and a timestamp used by higher layers for policy evaluation and message assembly. Additional parameters from the sensor(s) 126 may include heading and velocity when available from the receiver firmware.

In some implementations, the sensor(s) 126 can include a WPAN radio or transceiver, such as a BLUETOOTH transceiver. The WPAN transceiver may be configured to exchange signals used for proximity estimation. In some implementations, the operating system layer 130 can expose scan and advertisement callbacks via API(s) 136 that configure the application layer to request identifiers and received signal strength values from nearby devices. For example, the sensor(s) 126 can detect a WPAN advertisement from the paired device 190 and return a device address and a received signal strength indication that can be placed in proximity fields for co-location evaluation. The sensor(s) 126 may further provide channel index and scan interval parameters that influence the proximity sampling cadence.

In some implementations, the sensor(s) 126 can include a WLAN radio or transceiver, such as a WI-FI transceiver. In some implementations, the operating system layer 130 can expose API(s) 136 that return basic service set identifiers, signal strength values, and timing data from access points detected by the sensor(s) 126. For example, the operating system layer 130 can incorporate the WLAN detected identifiers/signal strength, into a fused provider that refines the latitude and longitude generated from the global navigation receiver and returns the fused coordinates with a timestamp. The sensor(s) 126 may provide channel number and operating band values that the fused provider can access to weight observations.

The sensor(s) 126 can include a near-field communication interface that provides contactless reads for close-range presence detection. In some implementations, the operating system layer 130 can expose API(s) 136 that cause the sensor(s) 126 to read a tag identifier and application data from a fixed transmitter during a tap. For example, the sensor(s) 126 can read an NFC tag at a checkpoint and return a tag identifier and an operating-system-generated time that can be added as proximity information for the paired device 190 or a fixed marker. The sensor(s) 126 may return protocol type and technology parameters that characterize the near-field communication transaction.

The operating system layer 130 (or OS layer) can provide an execution and mediation environment that implements sensor and cryptographic resources of the hardware layer 120 and exposes callable interfaces to the application layer 140. The operating system layer 130 can include location services 132 and an attestation engine 134 that receive requests (e.g., API calls) through API(s) 136. The operating system layer 130 can return coordinates and/or integrity outputs sourced through device drivers that access sensor(s) 126 in the hardware layer 120. In some implementations, the operating system layer 130 can implement kernel facilities that multiplex processor(s) 122, schedule threads, and arbitrate access to memory 124 for location acquisition and attestation operations. For example, the attestation engine 134 can invoke a trusted execution environment in the hardware layer 120 to generate a signature over selected fields using hardware-backed keys, and the location services 132 can fuse measurements from radios exposed by sensor(s) 126 and attach an operating-system-generated acquisition time. The operating system layer 130 can be implemented by different operating systems (OSs), such as a monolithic kernel platform, a microkernel platform, or a hybrid kernel platform, among others. In some implementations, the operating system layer 130 can be a mobile platform such as Android or iOS, a general-purpose platform such as Linux or Windows, or any other type of operating system platform.

The operating system layer 130 can include location services 132 that receive native calls (e.g., native API calls) from the application layer 140 via API(s) 136 and return current location data with an operating-system-generated timestamp. In some implementations, the location services 132 can service a request from the application layer 140 by querying sensor(s) 126 such as a global positioning system receiver, a wireless local area network transceiver, and/or a wireless personal area network transceiver to obtain radio observations for a fused fix. For example, the location services 132 can collect satellite measurements and identifiers or received signal strength values from nearby access points and peer devices, and compute latitude, longitude, and an acquisition time for delivery through an API(s) 136 callback. In some implementations, the location services 132 can gate release of location data behind an operating-system-mediated permission prompt initiated by the application layer 140 so that the requested coordinates and timestamp are returned only after consent is granted.

In some implementations, location services 132 can generate, produce, or otherwise provide timestamped location-based information over a time period/defined time interval. The location services 132 can provide the location-based information as coordinates and/or accelerometer data over the time period/time interval. As described in greater detail below, the application layer 140 can obtain attested location data and attested accelerometer readings over a defined time interval prior to an authentication request, such that a sequence of timestamped sensor outputs can be assembled. The application layer 140 can request current and historic readings from the hardware layer 120 through native operating system APIs exposed by the operating system layer 130, and generate a data packet comprising both spatial coordinates and motion data, each with corresponding operating-system-generated timestamps. This collection of attested data points can be transmitted in aggregate to the authentication server 160 during the authentication transaction.

The operating system layer 130 can include an attestation engine 134 that can generate hardware-rooted attestation results and digital signatures over selected data. In some implementations, the attestation engine 134 can attest to device integrity indicators and sign selected packet fields provided by an application in the application layer 140. For example, the attestation engine 134 can respond to a second native application programming interface call by returning device integrity data and a signature that corresponds to location data and the device integrity data. In some implementations, the device integrity data can include a debug or mock mode status, an installation source indicator, and/or an operating system or hardware modification indicator. The attestation engine 134 can employ keys anchored in a secure element or a trusted execution environment to generate Elliptic Curve Digital Signature Algorithm signatures bound to a nonce. For example, the attestation engine 134 can compute and sign a digest that encodes coordinates, an operating-system-generated timestamp, selected integrity fields, and a server-supplied challenge value.

The operating system layer 130 can expose API(s) 136 that present native API call surfaces for permission prompts, location acquisition, and attestation used by an application in the application layer 140. In some implementations, the API(s) 136 can include a first interface that the application layer 140 may call (e.g., transmit native API calls) to obtain current coordinates and an operating-system-generated timestamp, and a second interface that the application layer 140 may call (e.g., transmit native API calls) to request attestation of selected fields. For example, the application layer 140 can invoke a location request through the API(s) 136, receive a callback (e.g., API response data) that carries latitude and longitude with a timestamp, and issue a subsequent attestation request through the API(s) 136. In some implementations, the API(s) 136 can return an attestation value that encodes device integrity indicators corresponding to the location output previously returned to the application layer 140. For example, the API(s) 136 can deliver a structured byte sequence that the application layer 140 may place alongside the coordinates in a packet prepared at the application layer. The API(s) 136 can further provide permission gating that causes an operating-system-mediated dialog to be presented before any location data is returned to the application layer 140. For example, a permission call through the API(s) 136 may trigger a standardized consent dialog (as described in greater detail below with reference to FIG. 2), and location callbacks may be released only after the operating system layer 130 records an allow outcome.

The device 110 can include an application layer 140 that hosts multiple engines which together may form an application executing at the application layer 140. The authentication engine 142 can obtain user authentication information and provide the information as input fields for packet assembly. The communication engine 144 can serialize fields into a canonical structure and transmit a resulting packet to an authentication server 160. The proximity engine 146 can acquire proximity information for inclusion in the packet when such information is present. The consent engine 148 can render an operating-system-mediated permission prompt and gate subsequent location acquisition. In some implementations, the application layer 140 can orchestrate native calls to location services 132 and an attestation engine 134 and store returned values in memory 124 prior to requesting a signature. For example, a coordinator/controller within the application layer 140 can request coordinates from the location services 132, receive outputs, request device integrity data from the attestation engine 134, and trigger packet assembly by the communication engine 144 using the fields supplied by the authentication engine 142 and the proximity engine 146.

The application layer 140 can include an authentication engine 142 that receives an authentication request from the authentication server 160 and initiates an authentication transaction. The authentication engine 142 can obtain user authentication information by controlling credential input flows and by coordinating prompt sequencing with the consent engine 148. In some implementations, the authentication engine 142 can cause rendering of credential entry controls and a location permission prompt in a predetermined order. For example, the authentication engine 142 can prompt for credentials, request the consent engine 148 to present an operating-system-mediated location prompt, and signal the communication engine 144 after inputs are collected. The authentication engine 142 can signal the communication engine 144 to assemble a data packet that includes the collected user authentication information.

The authentication engine 142 can collect user authentication information including a username and password, a biometric information (e.g., an immutable identifier such as a date of birth, social security number, etc., home address, fingerprint scan, iris scan), images of the user (e.g., selfies or facial images), images of an identity document (ID) (e.g., a drivers license, state ID, passport, etc.), and/or a one-time code. In some implementations, the authentication engine 142 can generate a hashed credential value and place the value in a canonical payload prior to a signing request. For example, the authentication engine 142 can compute a value over a normalized username field and a one-time code and pass the value to the communication engine 144 as a payload element. In some embodiments, the authentication engine 142 can delimit field names, data types, and ordering for packet inclusion so that the communication engine 144 can serialize the user authentication information deterministically. In some implementations, the authentication engine 142 can provide the collected user authentication information to the communication engine 144 together with an indication that attestation of location and device integrity will follow. For example, the authentication engine 142 can pass a structure containing credential fields to the communication engine 144 and await a signal that a signed packet including the user authentication information has been transmitted.

The communication engine 144 can assemble a data packet and transmit the data packet to the authentication server 160 within a challenge window. In some implementations, the communication engine 144 can serialize packet fields using Concise Binary Object Representation or JavaScript Object Notation and post the serialized body over Hypertext Transfer Protocol Secure. For example, the communication engine 144 can normalize field ordering and data types and emit a byte sequence that preserves deterministic parsing at the authentication server 160. The communication engine 144 can include in the packet user authentication information, location data (e.g., location of the device, and/or historic locations over a defined time period, acceleration or motion data of the device, and/or historic motion data of the device over a defined time period), device integrity data, an operating-system-generated timestamp, and/or a digital signature generated by an attestation service. In some implementations, the communication engine 144 can access a correlation token and a nonce supplied by a previously received challenge and place the correlation token in a header field and the nonce in a signed field. For example, the communication engine 144 can append the nonce adjacent to the digital signature so that verification at the authentication server 160 can be performed against a single contiguous packet subset.

The application layer 140 can include a proximity engine 146 that can obtain proximity information from a paired device 190 using a wireless personal area network (WPAN), a wireless local area network (WLAN), and/or near-field communication (NFC), among others. In some implementations, the proximity engine 146 can execute scan and read operations through sensor(s) 126 and API(s) 136 prior to packet signing so that proximity measurements are available during packet assembly. For example, the proximity engine 146 can perform a Bluetooth WPAN scan, capture one or more device identifiers and received signal strength indication values, and pass the values to the communication engine 144 for placement in proximity fields. In some implementations, the proximity engine 146 can read an NFC tag identifier from a fixed transmitter at a checkpoint and append the identifier and a read time to proximity fields in the packet. For example, proximity to a workstation can be represented by a WPAN identifier and an associated signal strength so that co-location evaluation can reference the embedded proximity information.

The proximity engine 146 can facilitate use cases in which co-location between the device 110 and a paired device 190 informs application behavior. In some implementations, the proximity engine 146 can confirm presence along security rounds by reading NFC tag identifiers at fixed checkpoints and providing a read time for each identifier. For example, the proximity engine 146 can detect an NFC tag mounted at a doorway and output the tag identifier and a read time to indicate passage. In some implementations, the proximity engine 146 can determine proximity between the device 110 and a workstation by scanning Bluetooth advertisements from the paired device 190 and estimating distance from received signal strength indication values. For example, the proximity engine 146 can confirm that a phone and a laptop are within a threshold range by evaluating successive received signal strength indication samples acquired via the sensor(s) 126. In some implementations, the proximity engine 146 can characterize room-level presence by correlating wireless local area network access point identifiers observed by the sensor(s) 126 with identifiers provided by the paired device 190. For example, the proximity engine 146 can emit proximity fields that include a basic service set identifier set and a device address set to indicate co-presence in a conference room.

The application layer 140 can include a consent engine 148 that can render an operating-system-mediated prompt to obtain permission to share location data and gate subsequent location acquisition. In some implementations, the consent engine 148 can trigger an operating system dialog with allow and/or deny controls before any request is sent to location services 132, and the application can receive location data only after consent is granted. For example, a deny outcome can terminate the authentication attempt without invoking location services 132 so that no location request is issued. In some implementations, the consent engine 148 can record a consent outcome and a local timestamp for inclusion in unsigned metadata that accompanies a packet prepared by the communication engine 144. For example, the consent engine 148 can set a consent granted flag and a corresponding time value that the communication engine 144 transmits with the packet.

Figure 2:
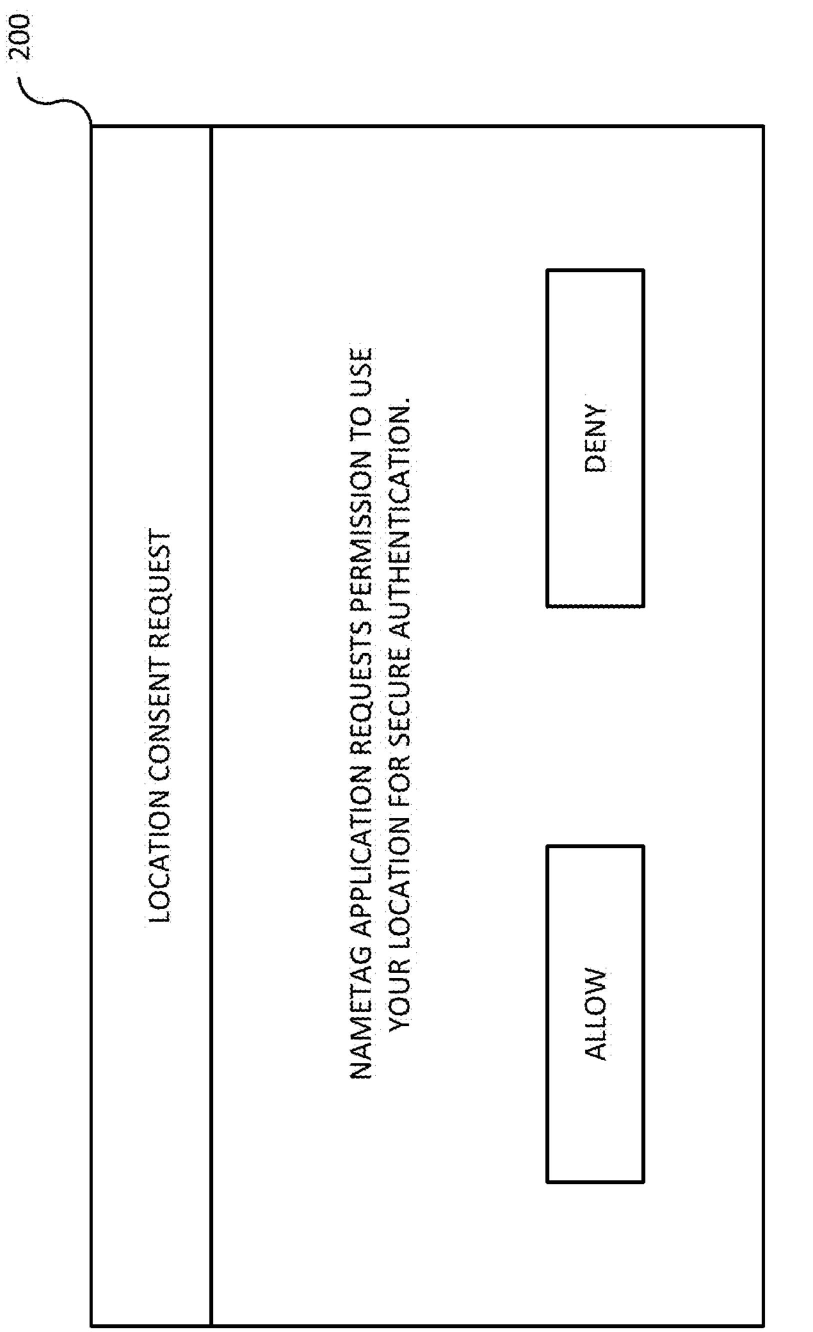
FIG. 2 is a view of a user interface showing a prompt to request consent for location sharing, in accordance with one or more implementations.

Referring briefly to FIG. 2, illustrated is a user interface 200 that can present an operating-system-mediated consent dialog for location sharing used during attested authentication. The user interface 200 can be invoked by a consent engine 148 in an application layer 140 through API(s) 136 so that an operating system layer 130 surfaces a standardized permission prompt with affirmative and negative controls. In some implementations, the user interface 200 can render a modal dialog or an in-app sheet with "Allow" and "Deny" selections raised by location services 132 of the operating system layer 130. For example, the user interface 200 can include a header region, a message that explains that location access is requested for authentication, and two selectable buttons that map to allow and deny outcomes. The user interface 200 can gate subsequent retrieval of coordinates such that an allow outcome facilitates a first native request to location services 132 via API(s) 136 and a subsequent invocation of an attestation engine 134 to bind integrity and location, and a deny outcome halts the sequence prior to any location request. In some implementations, the user interface 200 can pass an outcome value to the consent engine 148 so that the application layer 140 records the selection for policy and audit and determines whether downstream location acquisition proceeds.

Referring back to FIG. 1, the device 110 can include a communication device 150 that provides network connectivity for exchanges with the authentication server 160 and the third-party server 180. In some implementations, the communication device 150 can be a cellular modem, a wireless local area network adapter, an Ethernet interface, and/or a satellite transceiver, among others. For example, the communication device 150 can use Long Term Evolution or Fifth-Generation New Radio links for wide-area access, IEEE 802.11 links for local-area access, or an RJ-45 interface for wired access. The communication device 150 can transmit a response that includes a data packet with user authentication information and a digital signature, and may do so using Hypertext Transfer Protocol Secure over Transport Layer Security. In some implementations, the communication device 150 can employ Hypertext Transfer Protocol/2, WebSocket over Transport Layer Security, or QUIC over User Datagram Protocol to reduce round-trip latency while preserving ordered delivery semantics required by an application layer 140 serializer. For example, the communication device 150 can POST a signed payload to a challenge endpoint identified by a uniform resource locator and a correlation token before a deadline expressed as an absolute time value. The communication device 150 can receive a challenge body and a nonce issued by the authentication server 160 using push delivery or pull retrieval. In some implementations, push delivery can arrive through a platform notification channel that wakes the application layer 140, and pull retrieval can occur via periodic fetch, long polling, or a WebSocket message pump that carries challenge descriptors and nonce values. For example, the communication device 150 can accept a challenge message that specifies a nonce, a response path, and a timeout parameter, and the communication device 150 can return a corresponding response over the same connection or a new connection selected by protocol policy.

The authentication server 160 can operate as a network service associated with an application executing on the device 110 to perform challenge-response authentication for access to third-party server 180 resources and/or external services. In some implementations, the authentication server 160 may receive a trigger signal from the third-party server 180 indicating that a user seeks access to a protected resource. For example, the third-party server 180 may transmit a request that identifies a target application instance on the device 110 and a nonce to bind a response. The authentication server 160 can transmit a request to the application on the device 110 that instructs the application to gather user authentication information, obtain location data via a native operating system service, invoke an attestation service, and generate a signed packet. In some implementations, the authentication server 160 may receive a data packet from the device 110 that includes user authentication information, location data, device integrity data, and a digital signature generated by the attestation service. For example, the authentication server 160 can parse canonicalized fields indicated by the application and identify a subset associated with signature verification. The authentication server 160 can verify the digital signature using a cryptographic key associated with the attestation service or the device 110 and determine an authentication status based on the verified packet contents for delivery to the third-party server 180.

The authentication server 160 can include processor(s) 162 and memory 164, which may be similar to the processors 122 and memory 124 described above with reference to the device 110. The processor(s) 162 can execute instructions at the authentication server 160 to issue challenges, verify digital signatures, and evaluate policy rules. In some implementations, the processor(s) 162 can compute digests over canonicalized packet fields and perform Elliptic Curve Digital Signature Algorithm verification for received packets. For example, the processor(s) 162 can parse a packet body, identify attested fields such as coordinates and device integrity indicators, and route those fields to a signature verification engine 168 for cryptographic validation. The processor(s) 162 can validate correlation tokens and nonces prior to cryptographic operations to bind a response to a challenge. In some implementations, the processor(s) 162 can apply rule sets to attested inputs to determine an authentication status. For example, the processor(s) 162 can compute a denial when a debug or mock indicator is present, or when a geofence comparison indicates an out-of-region location. The authentication server 160 can include memory 164 that stores executable code for engines 166-174, key material, and transaction records. In some implementations, the memory 164 can retain public keys used for signature verification and policy configuration data used during rule execution. For example, the memory 164 can buffer incoming packets, persist timestamps and evaluated rule identifiers associated with correlation tokens, and store decision outcomes. The memory 164 can hold challenge parameters such as nonces and response deadlines for validation during receipt. For example, the processor(s) 162 can access a stored deadline from the memory 164 and compare an arrival time to mark an authentication exchange as expired.

The authentication server 160 can include a request management engine 166. The request management engine 166 can receive authentication requests from a third-party server 180 and issue challenges to an application on a device 110. For example, the request management engine 166 can accept a ticket identifying a user and generate a challenge body that carries a nonce, requested field indicators, and a response deadline. In some implementations, the request management engine 166 can transmit the challenge by pushing a message to the device 110 or by prompting the application to fetch the challenge body over Hypertext Transfer Protocol Secure. For example, the request management engine 166 can expose an endpoint that returns the challenge body when the application presents a correlation token. The request management engine 166 can track correlation tokens and deadlines for each transaction and can reject late packets and mark a transaction expired when a deadline elapses.

The request management engine 166 can initiate a challenge when a third-party server 180 requests authentication during onboarding of a new hire. In some implementations, the request management engine 166 can encode in the challenge body a nonce, a correlation token, and requested context fields suited for an employment verification exchange. For example, the request management engine 166 can specify that a response include user authentication information and/or current location data within a defined response window. The request management engine 166 can push the challenge to the device 110 associated with the candidate or can prompt the application to fetch the challenge body over Hypertext Transfer Protocol Secure. For example, the request management engine 166 can select a shorter deadline for in-person onboarding than for remote onboarding.

The request management engine 166 can initiate a challenge when a third-party server 180 requests authentication for jurisdiction-restricted online gaming or for approval of a financial transaction. In some implementations, the request management engine 166 can tailor requested fields to the transaction type and encode a nonce, a correlation token, and a deadline that reflects the expected interaction time. For example, the request management engine 166 can request context suitable for a gaming session start, or can request context suitable for a high-value transfer, among others. The request management engine 166 can transmit the challenge to the device 110 by push delivery or can prompt the application to fetch the challenge body over Hypertext Transfer Protocol Secure. For example, the request management engine 166 can select an immediate-response deadline for point-of-sale activity and can reject packets that arrive after the deadline.

Figure 3:
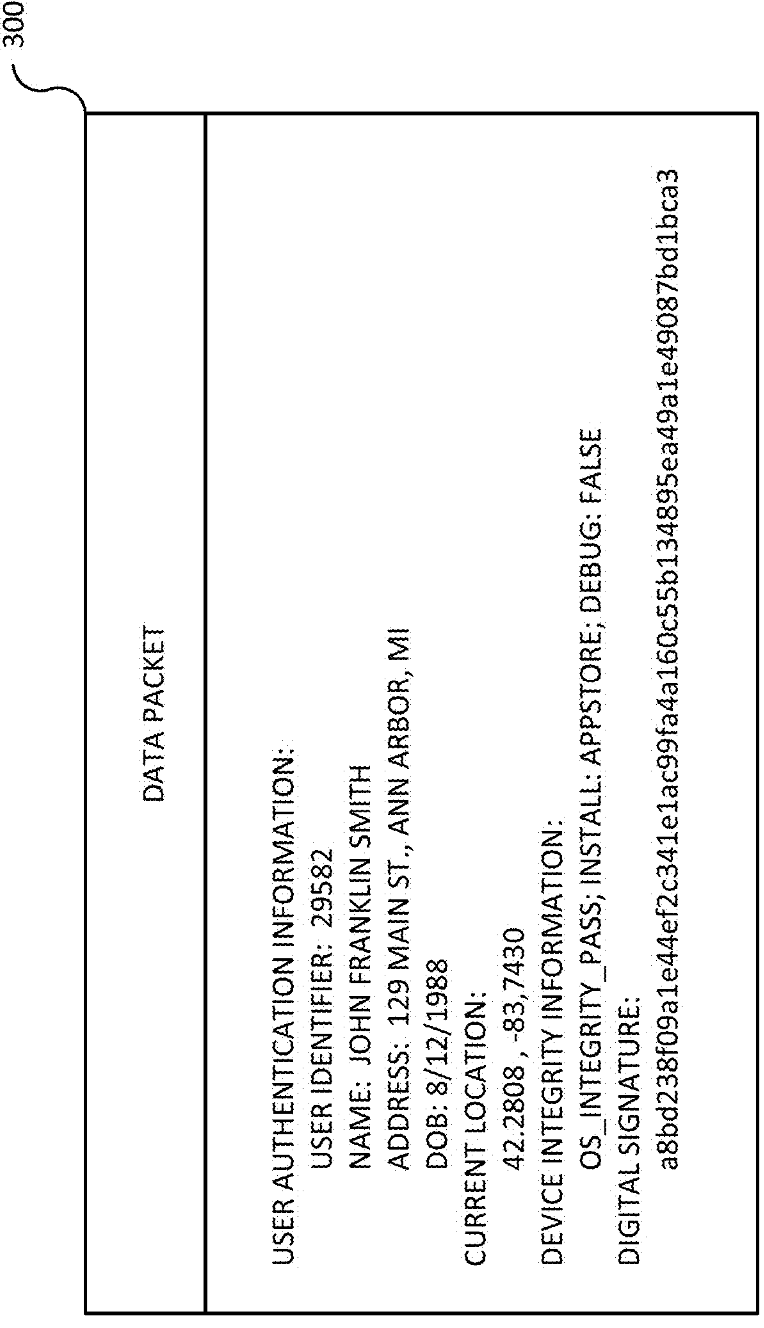
FIG. 3 is a diagram illustrating the structure and contents of an attested authentication data packet, in accordance with one or more implementations.

Referring now to FIG. 3, depicted is an example data packet 300 that may be received by the authentication server 160 and generated by the device 110 in connection with an authentication challenge-response. The data packet 300 can define a canonical message that binds user authentication information, current location data, device integrity data, and a digital signature for delivery to an authentication server 160. In some implementations, an application executing on a device 110 can serialize the data packet 300 in a deterministic order using Concise Binary Object Representation or JavaScript Object Notation to preserve unambiguous field boundaries. For example, the data packet 300 can include fields labeled "USER AUTHENTICATION INFORMATION", "CURRENT LOCATION", "DEVICE INTEGRITY INFORMATION", and "DIGITAL SIGNATURE", and can further include an operating-system-generated timestamp and/or proximity data. In some implementations, an attestation engine 134 in an operating system layer 130 can generate the digital signature over selected fields that include geographic coordinates, the operating-system-generated timestamp, device integrity indicators, and/or the user authentication information. For example, the attestation engine 134 can compute an Elliptic Curve Digital Signature Algorithm signature over a digest that concatenates the selected fields and a challenge nonce issued by the authentication server 160. In some implementations, a communication engine 144 in an application layer 140 can transmit the data packet 300 over Hypertext Transfer Protocol Secure to the authentication server 160, and the authentication server 160 can verify the digital signature using a cryptographic key associated with the device 110 or the attestation engine 134. In some implementations, the data packet 300 can embed proximity evidence sourced from a paired device 190 such as a Bluetooth wireless personal area network identifier and received signal strength indication, a wireless local area network basic service set identifier, and/or a near-field communication tag identifier, among others. For example, the application layer 140 can emit the user authentication information, the current location coordinates, the device integrity indicators, and a signature value in a predetermined order, to facilitate deterministic parsing at the authentication server 160. In some implementations, location services 132 can supply the OS-generated timestamp that indicates when the current location data was obtained, and the data packet 300 can carry the timestamp as an explicit field.

Referring back to FIG. 1, the authentication server 160 can include a signature verification engine 168 configured to validate, authenticate, or otherwise verify digital signatures included in or appended to data packets from devices. The authentication server 160 can supply the signature verification engine 168 with a cryptographic verification key associated with a device attestation service or a particular device instance. In some implementations, the signature verification engine 168 can access a public key issued by an attestation authority through public key storage or through device enrollment records that bind a device identifier to a certificate chain. For example, the signature verification engine 168 can select an Elliptic Curve Digital Signature Algorithm P-256 public key embedded in an X.509 certificate that chains to a platform root, or can access a device-unique public key exposed by a trusted execution environment, among others. In some implementations, the signature verification engine 168 can select among multiple candidate public keys based on a platform indicator, a certificate subject, and/or a key identifier carried in packet metadata.

The signature verification engine 168 can apply the selected cryptographic verification key to validate a digital signature included in a packet received at the authentication server 160. In some implementations, the signature verification engine 168 can parse canonicalized fields identified for attestation and compute a digest over the fields and a challenge nonce prior to verification. For example, the signature verification engine 168 can perform Elliptic Curve Digital Signature Algorithm verification over latitude, longitude, an operating-system-generated timestamp, device integrity indicators, and the nonce serialized in a deterministic order. The signature verification engine 168 can output a verification result that gates subsequent location and policy evaluation at the authentication server 160.

The authentication server 160 can include a location verification engine 170 that can evaluate attested coordinates against geographic constraints defined by policy data accessible to the authentication server 160. In some implementations, the location verification engine 170 can interpret latitude and longitude values in a specified geographic region and compare the values to one or more allowed regions expressed as polygons, multipolygons, and/or buffered polylines. In some implementations, the location verification engine 170 can apply tolerance parameters, such as maximum age of coordinates and/or maximum distance from a boundary, to determine pass or fail outcomes. In some implementations, the location verification engine 170 can receive/determine/identify jurisdiction descriptors that encode country, state, and/or locality identifiers mapped to corresponding geofences. The location verification engine 170 can evaluate optional proximity inputs included in the packet, such as WPAN received signal strength indication values and/or near-field communication tag identifiers, to enforce co-location rules associated with fixed transmitters and/or paired devices.

For example, the location verification engine 170 can receive coordinates that correspond to a point-in-polygon test against a city-level geofence and compute a pass when the point lies inside the polygon. In some implementations, the location verification engine 170 can further evaluate proximity data by comparing a WPAN received signal strength indication from a paired workstation to a threshold and compute co-location when the received signal strength indication is greater than the threshold. In some implementations, the location verification engine 170 can gate the geographic evaluation to execute after a verification outcome is provided by a signature verification engine 168 at the authentication server 160. The location verification engine 170 can combine the geofence result and the proximity result using policy-specified conjunction or disjunction rules to yield a location validation outcome.

In some embodiments, the location verification engine 170 can evaluate the trajectory and motion signatures included and/or incorporated in the data packet, to conduct consistency checks between device movement and reported location fixes. In some implementations, the location verification engine 170 can compute statistical or physical models over a sequence of accelerometer/motion data for a defined time period, to determine whether the attested positioning data aligns with expected sensor outputs. For example, the location verification engine 170 may be configured to verify that accelerometer-derived changes in position correspond to location deltas observed in the coordinates.

In some implementations, the location verification engine 170 can compare jurisdiction attributes extracted from identity document data to jurisdiction attributes inferred from the attested coordinates. For example, the location verification engine 170 can detect that the identity document indicates issuance by a particular state of the United States and that the attested coordinates resolve to a foreign country or a different continent, and can compute a fail outcome for the location validation when such a mismatch is present. Additional parameters may include a mapping between identity document issuers and allowed polygons, a maximum coordinate age for the comparison, and/or a rule that requires country-level or continent-level consistency before a pass outcome is computed.

The authentication server 160 can include a key management engine 172 that can obtain, store, rotate, and/or retrieve cryptographic verification keys used during signature verification. In some implementations, the key management engine 172 can access public key storage and/or device enrollment records to locate a verification key associated with an attestation authority or a particular device instance. For example, the key management engine 172 can fetch an attestation authority certificate chain from public key storage and identify a corresponding Elliptic Curve Digital Signature Algorithm P-256 public key bound to a device identifier in enrollment data. The key management engine 172 can supply the signature verification engine 168 with the cryptographic verification key associated with an attestation service or a device so that the signature verification engine 168 can validate a received signature over attested fields. In some implementations, the key management engine 172 can select among multiple candidate verification keys based on a device platform indicator and/or a key identifier carried in packet metadata. For example, the key management engine 172 can map a platform indicator to an attestation authority root and select a leaf public key whose subject and key identifier match values included in the packet. The key management engine 172 can maintain key lineage and validity intervals that constrain which verification keys are eligible for use during signature verification. For example, the key management engine 172 can reject use of a verification key when the key management engine 172 determines that the key is expired or revoked under the maintained validity data.

The authentication server 160 can include a policy evaluation engine 174 that computes an authentication status for a received packet after cryptographic verification. The policy evaluation engine 174 can receive normalized inputs such as location data, device integrity indicators, proximity measurements, and user authentication information. In some implementations, the policy evaluation engine 174 can receive a verification outcome from a signature verification engine 168 and gate subsequent rule execution on a successful outcome. For example, the policy evaluation engine 174 can evaluate one or more predicates that reference latitude and longitude coordinates, an operating-system-generated acquisition time, and/or attestation-reported flags. Additional parameters may include a challenge nonce association, a proximity signal strength threshold, and/or a required installation source indicator.

The policy evaluation engine 174 can obtain rule sets from multiple origins and/or select an active policy at evaluation time. In some implementations, the policy evaluation engine 174 can apply a default authentication policy maintained by the authentication server 160 when no external directive is present. In some implementations, the policy evaluation engine 174 can accept policy directives embedded in a request from a third-party server 180 that specify required fields and constraint values. For example, a request can specify a jurisdiction fence, a maximum coordinate age, and/or a prohibition on debug or mock indicators, among others. In some implementations, the policy evaluation engine 174 can select a policy variant that corresponds to a transaction type or a protected resource class and map that variant to parameter values referenced by the predicates.

The policy evaluation engine 174 can compute a positive authentication status when attested inputs satisfy the active policy. In some implementations, the policy evaluation engine 174 can approve access when a point-in-polygon test places the coordinates within an allowed region and the coordinate age is less than a threshold. For example, the policy evaluation engine 174 can return approval when latitude and longitude fall inside a state-level geofence, the operating-system-generated timestamp is not older than thirty seconds, and all integrity indicators report no debug, no mock provider, and an official application store installation. In some implementations, the policy evaluation engine 174 can receive proximity evidence and compute approval when a received signal strength indication from a paired device 190 exceeds a minimum value. For example, the policy evaluation engine 174 can approve workstation access when a WPAN received signal strength indication exceeds a threshold and the device 110 location lies inside a facility polygon.

The policy evaluation engine 174 can compute a negative authentication status when any predicate of the active policy fails. In some implementations, the policy evaluation engine 174 can deny access when the signature verification outcome indicates failure or when an integrity indicator signals mock location or a rooted or jailbroken state. For example, the policy evaluation engine 174 can return denial when the coordinates fall outside a jurisdiction fence or when the coordinate age exceeds a freshness threshold. In some implementations, the policy evaluation engine 174 can deny access when proximity evidence is missing or below a specified strength. For example, the policy evaluation engine 174 can compute denial for a transaction that requires co-location when no near-field communication tag identifier is present or when a Bluetooth received signal strength indication is below a minimum value.

The system 100 can include a third-party server 180 that hosts a protected resource and delegates authentication to the authentication server 160. In some implementations, the third-party server 180 can generate and transmit an authentication request carrying a correlation token and requested context to the authentication server 160. For example, the third-party server 180 can specify context selectors for attested location and device integrity and place the correlation token in a header field addressed to the authentication server 160. In some implementations, the third-party server 180 can receive from the authentication server 160 an authentication status indicating approval or denial after evaluation of attested data. For example, the third-party server 180 can grant or deny access to a portal based on the returned authentication status. The third-party server 180 can exchange messages with the authentication server 160 over secure channels and bind a response to the originating request using the correlation token provided by the authentication server 160. For example, the third-party server 180 can process a callback that includes the correlation token, a decision value, and one or more reason codes.

The system 100 can include a paired device 190 that exchanges short-range signals with the device 110 to provide proximity information for inclusion in a packet and for evaluation by the authentication server 160. In some implementations, the paired device 190 can be a mobile phone, a tablet, a wearable, and/or a fixed transmitter such as an NFC tag or a workstation beacon, among others. In some implementations, the paired device 190 can transmit identifiers and measurement values via wireless personal area network (WPAN), wireless local area network (WLAN), and/or near-field communication (NFC). For example, the device 110 can read a tag identifier from the paired device 190 over NFC or measure a Bluetooth received signal strength indication value via WPAN and place the values in proximity fields of a packet. For example, WPAN observations collected by the device 110 can include a device address, advertising data, and a channel index that the device 110 may use to derive an estimated proximity range. In some implementations, the device 110 can correlate WLAN basic service set identifiers emitted by the paired device 190 with concurrently observed identifiers to indicate co-presence within a local area. The authentication server 160 can evaluate co-location constraints using the proximity information associated with the paired device 190, for example to satisfy a workstation-access policy linked to a workstation identified as the paired device 190.

Figure 4:
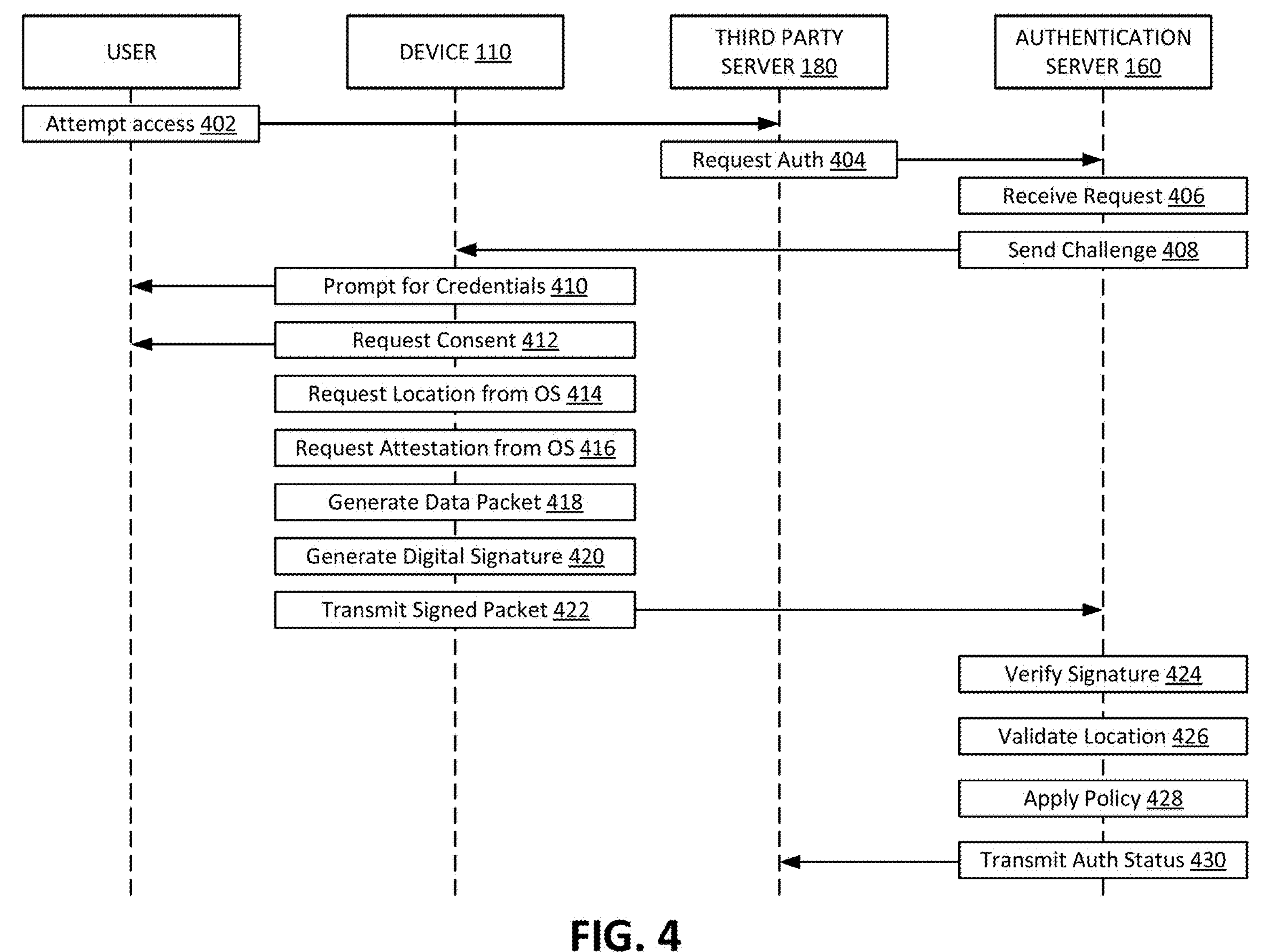
FIG. 4 is a process flow diagram illustrating an authentication process, in accordance with one or more implementations.

Referring now to FIG. 4, depicted is a flow diagram of a method 400 of attested location-based authentication. The method 400 can be executed, performed, or otherwise carried out by any of the computing systems or devices described herein, such as across those devices/components/hardware depicted in FIG. 1 and described above. In brief overview of the method 400, the method 400 can include attempting access to a protected resource (step 402), transmitting a request for authentication from a third-party service to an authentication service (step 404), receiving the request at the authentication service (step 406), transmitting a challenge to an application on a device (step 408), prompting for user credentials at the device (step 410), requesting consent for location sharing (step 412), requesting location from a native operating system service (step 414), requesting attestation from a native operating system attestation service (step 416), generating a canonical data packet (step 418), generating a digital signature over selected fields (step 420), transmitting a signed packet to the authentication service (step 422), verifying the signature (step 424), validating location information (step 426), applying policy (step 428), and transmitting an authentication status (step 430).

The method 400 can include attempting access to a protected resource at step 402. The attempt can be initiated by a third-party server 180 that fronts the protected resource or by an application executing on the device 110 that invokes a backend workflow. In some implementations, the attempt can correspond to onboarding, transaction approval, or session log-in initiated from a client application on the device 110. For example, a human resources portal hosted by the third-party server 180 can initiate an access attempt before releasing personnel records. The attempt can trigger a location-attested authentication sequence governed by the authentication server 160. In some implementations, the access attempt can occur before any request to location services 132 or any invocation of the attestation engine 134 so that user consent can be obtained by the consent engine 148 downstream. For example, the workflow can defer operating system location calls until after a user-facing permission prompt is resolved in the application layer 140.

The method 400 can include transmitting a request for authentication at step 404. The third-party server 180 can transmit a request to the authentication server 160 over a secure channel. In some implementations, the request can specify a user identifier, a relying-party resource identifier, and requested context, such as location and/or proximity indicators. For example, an employer system can forward an authentication ticket that delegates an authentication operation from the third-party server 180 to the authentication server 160. In some implementations, the request can include a correlation token used to bind later responses between the third-party server 180 and the authentication server 160. For example, a unique identifier can be placed in a request header that the authentication server 160 may provide in a subsequent challenge, and in a response header from the authentication server 160 to the third-party server 180.

The method 400 can include receiving an authentication request at the authentication server 160 at step 406. The authentication server 160 can parse the request to identify a target application instance and a corresponding device 110 that should respond. In some implementations, the authentication server 160 can process the request immediately and generate a challenge directed to the application on the device 110. For example, the authentication server 160 can select policy parameters that indicate attested location is required and specify context field selectors for location data. The authentication server 160 can retrieve routing metadata used to deliver the challenge to the identified application instance on the device 110. For example, the authentication server 160 can access a registered push endpoint and/or a network address descriptor associated with the application instance to transmit the challenge. In some implementations, the challenge can include a directive that causes the device 110 to launch an app clip of the application when a full installation is absent. For example, the challenge can carry a store locator or deep link that causes the device 110 to open an official application store and download the application prior to presenting the challenge to the application. Upon downloading the application, the application may include (or the device may store) a digital signature or other identifier indicating a source of the application (e.g., as the official application store), which may be included in metadata of an authentication packet and used for verifying that the application was downloaded from the official application store, as described in greater detail below.

The method 400 can include transmitting a challenge to an application on the device 110 at step 408. The authentication server 160 can generate and send the challenge after receipt of a request from the third-party server 180 and before the application on the device 110 acquires location. In some implementations, the authentication server 160 can specify in the challenge requested context fields, a nonce, a response deadline, and a correlation token that associates the challenge with a transaction. For example, the authentication server 160 can instruct the application on the device 110 to obtain current location data from a native operating system service, to obtain device integrity data from an attestation service, and to return a signed packet that includes selected fields. In some implementations, the authentication server 160 can deliver the challenge via push messaging to the device 110 or via a direct connection initiated by the application on the device 110. For example, the application on the device 110 can open Hypertext Transfer Protocol Secure to fetch a challenge body that carries the nonce to be signed and the correlation token to be echoed.

The method 400 can include prompting for user credentials at step 410, in which the authentication engine 142 renders a credential input interface after a challenge is received and before packet assembly by the communication engine 144. In some implementations, the authentication engine 142 may obtain user authentication information as a username/password, a biometric information, facial images, images of IDs, and/or a one-time code. For example, the authentication engine 142 can request a passcode and serialize the value for placement by the communication engine 144 into fields of a canonical packet. In some implementations, the authentication engine 142 may stage the collected values in volatile memory 124 and retain a hashed representation during attestation by the attestation engine 134 of the operating system layer 130. For example, the authentication engine 142 can store a transient hash in the memory 124 until the attestation engine 134 completes signing, after which the communication engine 144 transmits the packet and the authentication engine 142 clears the temporary buffers.

The method 400 can include requesting consent for location sharing at step 412, in which an application in the application layer 140 triggers an operating system layer 130 permission prompt through API(s) 136 to permit/deny access to location services 132. In some implementations, the operating system layer 130 can present a standardized dialog or user interface (such as the user interface shown in FIG. 2) that precedes any call from the application layer 140 to location services 132. For example, when a user selects "Allow," the application layer 140 can proceed to issue a first native request for coordinates to location services 132, and when a user selects "Deny," the application layer 140 can terminate the sequence without issuing the location request. In some implementations, the application layer 140 can record a consent outcome and a local time value for inclusion in packet context fields prepared by a communication engine 144. For example, the application layer 140 can place a consent-granted flag and a corresponding timestamp in unsigned fields of a packet transmitted during step 418.

The method 400 can include requesting location from a native operating system service (such as location services 132) at step 414 by issuing a first native call from an application layer 140 component to location services 132 through API(s) 136. In some implementations, the request can be issued after a consent engine 148 indicates an allow outcome and before an attestation engine 134 is invoked to attest subsequent fields. The location services 132 can return current location data received from sensor(s) 126, such as a global positioning system receiver, a wireless personal area network transceiver, a wireless local area network transceiver, and/or a near-field communication interface. For example, the application layer 140 can call a front-end exposed by location services 132 to obtain latitude and longitude with an operating-system-generated timestamp. The operating system layer 130 can attach a system timestamp that identifies an acquisition time associated with the returned coordinates. For example, a callback delivered through API(s) 136 can include the coordinates and the acquisition time, and the application layer 140 can place the values into packet fields prepared for later attestation, as described in greater detail below.

The method 400 can include requesting attestation from an attestation engine 134 at step 416. An application executing in an application layer 140 can issue a second native call through API(s) 136 to the attestation engine 134 after location services 132 return coordinates and an operating-system-generated timestamp. In some implementations, the application layer 140 can supply canonicalized fields to the attestation engine 134 that include latitude, longitude, the operating-system-generated timestamp, and device integrity inputs. For example, the application layer 140 can pass a deterministic byte sequence that encodes coordinates, a time value, and integrity indicators such as a debug status, a mock location status, an installation source indicator, or an operating system and/or hardware modification indicator. The attestation engine 134 can return device integrity data that characterizes operational components of the device 110 together with a signature that corresponds to the supplied fields. In some implementations, the attestation engine 134 can employ hardware-backed keys included in a trusted execution environment of the hardware layer 120, to generate an elliptic curve digital signature algorithm (ECDSA) signature across the location values, the integrity subset, and the timestamp. For example, a secure enclave or a trusted execution environment can sign the packet subset covering the coordinates, the operating-system-generated acquisition time, and the device integrity data for subsequent verification at the authentication server 160.

The method 400 can include generating a data packet at 418, by a communication engine 144 executing in an application layer 140 of the device 110. The communication engine 144 can assemble fields that include user authentication information, location data, device integrity data, and an operating-system-generated timestamp prior to network transmission. In some implementations, the communication engine 144 can perform the packet generation after the authentication engine 142 obtains credentials, after location services 132 provide coordinates, and after an attestation engine 134 returns integrity indicators. The communication engine 144 can serialize the packet fields in a deterministic order (e.g., using concise binary object representation and/or JavaScript object notation). For example, the communication engine 144 can generate a byte sequence that places credential fields, geographic coordinates, device integrity indicators, and the operating-system-generated timestamp in a fixed schema. In some implementations, the communication engine 144 can include proximity information obtained from a paired device 190 via a wireless personal area network, a wireless local area network, and/or near-field communication. For example, the communication engine 144 can insert a proximity section that carries WPAN received signal strength indication values from a wearable/paired device, along with associated identifiers, in positions reserved for proximity fields within the packet.

The method 400 can include generating a digital signature at step 420. The device 110 can generate the digital signature for the packet (or portions thereof) by invoking an attestation engine 134 to sign selected packet fields using device-rooted private keys. In some implementations, an application layer 140 can request signature generation after packet field generation, so that field ordering and data types remain deterministic for verification. For example, a communication engine 144 can compute a hash over latitude, longitude, an operating-system-generated timestamp, device integrity indicators, and a challenge nonce, and can supply the hash to the attestation engine 134 for signing. In some implementations, the attestation engine 134 can produce an elliptic curve digital signature algorithm signature (ECDSA) that corresponds to the location data and the device integrity data and may further bind a value determined/derived from user authentication information. For example, the attestation engine 134 can return an ECDSA-P256 signature over the hash that encodes the selected packet subset and the nonce. In some implementations, the communication engine 144 can attach the resulting signature to a packet as a distinct field that is separate from an unsigned header for verification at an authentication server 160. For example, the communication engine 144 can place a signature value adjacent to canonicalized fields so that a verifier can reconstruct the same hash over the indicated subset.

The application layer 140 can transmit the signed packet at step 422, as a response to a challenge using a transceiver of the communication device 150 over a secure transport. The packet may be similar to the packet 300 shown in FIG. 3. In some implementations, the transmission can include user authentication information and the digital signature generated for the packet fields. For example, the communication device 150 can POST a payload to an endpoint at the authentication server 160 that is associated with the issued challenge. The send operation can occur after signature generation and within a validity window indicated by the challenge parameters. In some implementations, the transmission can include a nonce that binds the response to the originating request. For example, the authentication server 160 can reject a packet when the expected nonce value is absent from the transmitted payload.

The authentication server 160 can verify a digital signature of a received packet at step 424, using a cryptographic verification key associated with an attestation service or the device 110. In some implementations, a key management engine 172 can obtain the verification key from the device 110 and/or public key storage and provide the verification key to a signature verification engine 168. The signature verification engine 168 can identify canonicalized fields indicated for attestation and compute a digest over the fields and a challenge nonce. For example, the signature verification engine 168 can compute a hash over latitude, longitude, an operating-system-generated timestamp, device integrity indicators, and the nonce, among others, and apply ECDSA verification using the provided verification key. The verification by the signature verification engine 168 can occur before any location verification or policy evaluation executed at the authentication server 160. The authentication server 160 can reject a packet when the signature verification engine 168 determines that signature verification fails or when attested integrity indicators correspond to an unacceptable configuration. For example, the authentication server 160 can compute denial without geofence evaluation when attested fields indicate a rooted state or a mock-location state.

The method 400 can include validating location information at step 426, by the location verification engine 170 after a successful outcome at the signature verification engine 168 and integrity checks at the authentication server 160. In some implementations, the location verification engine 170 may determine whether attested coordinates carried in the data packet 300 are located within an allowed geographic region defined by one or more geofences and/or jurisdiction lists. For example, the location verification engine 170 can perform a point-in-polygon evaluation against a third-party server-supplied polygon or multipolygon and compute a pass outcome when the coordinates fall inside the boundary. In some implementations, the location verification engine 170 may evaluate co-location constraints using proximity information in the data packet 300 such as identifiers and received signal strength indication values sourced from a paired device 190 via a wireless personal area network transceiver, a wireless local area network transceiver, and/or a near-field communication interface. For example, the location verification engine 170 can accept Bluetooth received signal strength indication values associated with the paired device 190 linked to a workstation and determine that a threshold is met to satisfy a co-location rule for workstation access.

The method 400 can include applying policy at step 428. The policy evaluation engine 174 of the authentication server 160 can compute a decision using inputs that include a verified digital signature status, attested location values, device integrity indicators, and/or credential outcomes. In some implementations, the policy evaluation engine 174 can execute after the location verification engine 170 produces a location validation outcome and before an authentication status is determined. For example, the policy evaluation engine 174 can deny access when a debug indicator is true or when latitude and longitude lie outside an allowed region. In some implementations, the policy evaluation engine 174 can record decision artifacts and associate the artifacts with a correlation token for audit. For example, the authentication server 160 can persist a policy version identifier and evaluated input values in a transaction record addressed by the correlation token. In some embodiments, the policy applied at step 428 may include analysis of historical data (e.g., received in the packet or previously received from the device 110) relating to motion and/or location over a defined time period, which is compared against the location data from the packet, to determine whether or not the location data has been fabricated. As another example, the policy applied at step 428 may include analysis of metadata of the data packet corresponding to a source of the application, to determine whether a digital signature corresponding to the source is associated with, matched with, or otherwise corresponds to an official application store.

The method 400 can include transmitting an authentication status from the authentication server 160 to the third-party server 180 after policy evaluation by the policy evaluation engine 174 completes. In some implementations, the authentication server 160 can generate a status value indicating approval or denial and include one or more reason codes tied to evaluated policy results. For example, the authentication server 160 can POST an allow or deny indicator with a set of reason identifiers to a callback endpoint specified by the third-party server 180 in the originating request. In some implementations, the authentication server 160 can include in the response a correlation token and the challenge nonce issued for the transaction so that the third-party server 180 can bind the returned status to the active session. For example, the authentication server 160 can generate a body that carries fields for status, reason identifiers, correlation token, and nonce, and the third-party server 180 can discard responses that omit the expected nonce. In some implementations, the third-party server 180 can use the status to grant or deny access to a protected resource. For example, the third-party server 180 can provision a session token only when the status indicates approval and the echoed nonce matches a value issued for the corresponding challenge.

Figure 5:
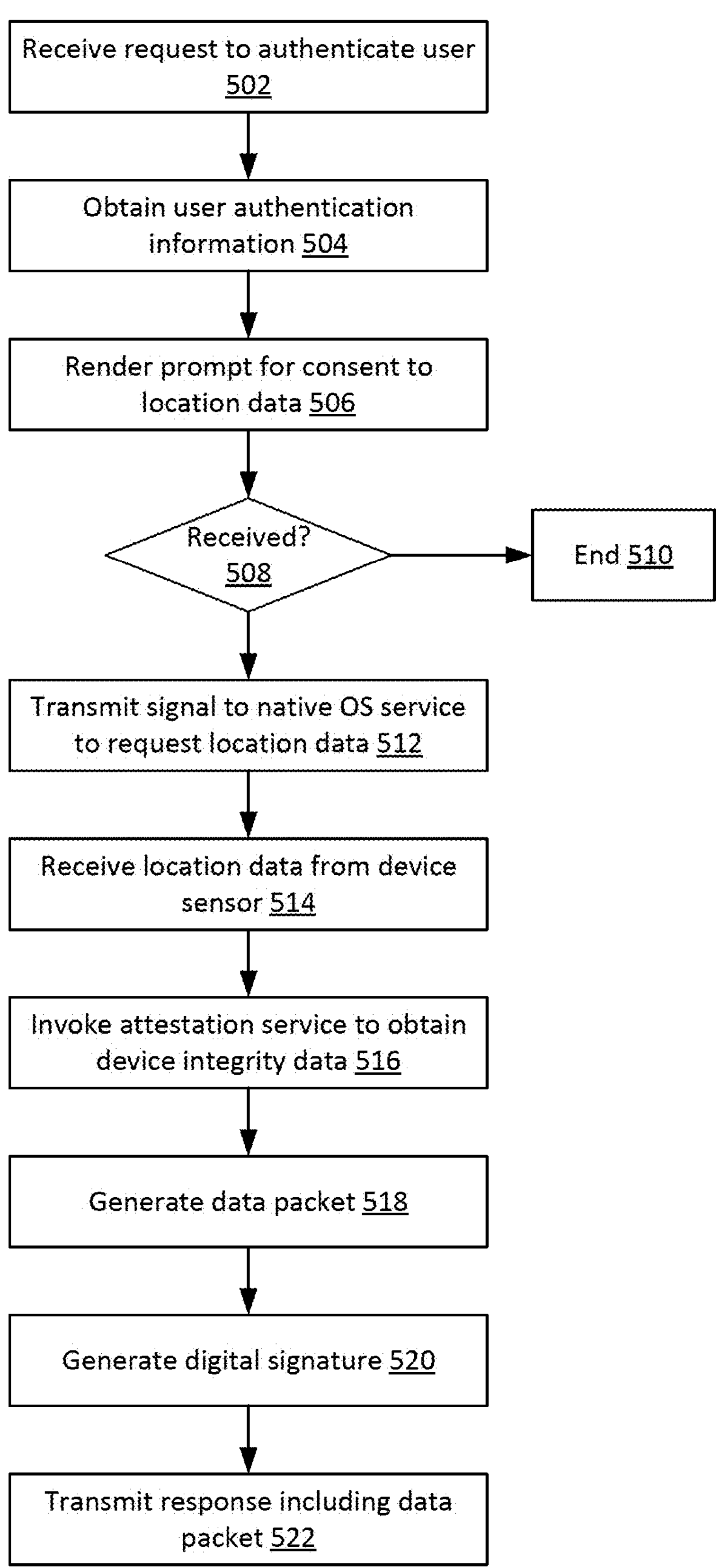
FIG. 5 is a flow chart illustrating a method for location-based user authentication on a device, in accordance with one or more implementations.

Referring now to FIG. 5, illustrated is a method 500 of location-based user authentication executed on a device application. The method 500 can be implemented by the device 110 described above with reference to FIG. 1-FIG. 4. The method 500 can include receiving a request to authenticate a user (step 502), obtaining user authentication information (step 504), rendering a prompt for consent to location data (step 506), determining whether consent is received (step 508) and optionally ending (step 510), transmitting a signal to a native operating system service to request location data (step 512), receiving location data from a device sensor (step 514), invoking an attestation service to obtain device integrity data (step 516), generating a data packet (step 518), generating a digital signature (step 520), and transmitting a response including the data packet (step 522).

The method 500 can include receiving a request to authenticate a user at an application executing on the device 110 at step 502. The application on the device 110 can receive, from an authentication server 160 associated with the application, a request that initiates an authentication transaction. In some implementations, the authentication server 160 can deliver the request to the application on the device 110 by push notification or by Hypertext Transfer Protocol Secure pull that carries a challenge token and requested context indicators. In some implementations, a third-party server 180 can delegate the authentication action to the authentication server 160, and the authentication server 160 can address the resulting challenge to the application on the device 110 identified for the user. For example, a portal access attempt at the third-party server 180 can cause backend logic to route a challenge toward the device 110 selected for the transaction. The application on the device 110 may open a secure session to fetch a challenge body from the authentication server 160 and correlate the body with a transaction identifier supplied for the exchange. For example, the application on the device 110 can call a challenge endpoint at the authentication server 160 with a correlation token to retrieve parameters that are to be echoed in a subsequent response.

The method 500 can include obtaining user authentication information at step 504. Step 504 may be performed by execution of an authentication engine 142 of an application on the device 110. In some implementations, the authentication engine 142 can render input controls and receive credential fields such as a username/password pair, a biometric confirmation, facial images, images of an ID, and/or a one-time code for later serialization by a communication engine 144. For example, the authentication engine 142 can prompt for a passcode or request identity information, and supply a corresponding value to the communication engine 144 as a canonical field. In some implementations, the obtaining can occur after the application connects to a challenge endpoint exposed by an authentication server 160 and before any attestation request to an attestation engine 134 so that the collected fields are bound to the same transaction. For example, the authentication engine 142 can initiate user prompting after receipt of a challenge descriptor and can complete input collection prior to any native operating system layer 130 attestation calls. In some implementations, the authentication engine 142 can store received credential values in volatile memory 124 during packet assembly and clear associated working buffers after field transfer to the communication engine 144. For example, a hashed credential field can be retained transiently in memory 124 until signature generation over canonicalized fields completes.

The method 500 can include rendering a prompt for consent to location data by an application layer 140 on a device 110 at step 506. The consent engine 148 can invoke native permission API(s) 136 of an operating system layer 130 to initiate a location permission transaction. In some implementations, the operating system layer 130 can surface a standardized dialog with allow and/or deny controls prior to any request to location services 132. For example, the operating system layer 130 can display a modal prompt that blocks subsequent location acquisition until an outcome is selected. In some implementations, workflow logic at the application layer 140 can branch to termination when the outcome equals deny. For example, the application layer 140 can suppress any call to location services 132 and exit the sequence without generating a packet. In some implementations, the application layer 140 can record a consent outcome value and a local timestamp for association with a challenge. For example, the communication engine 144 can add an internal flag and a time value as unsigned metadata fields during packet assembly.

The method 500 can include determining whether consent is received at step 508 by evaluating an operating system permission outcome returned through API(s) 136. In some implementations, an application executing in the application layer 140 can request from the consent engine 148 an outcome value that grants or denies access to location services 132. For example, the consent engine 148 can obtain a status from an operating system dialog and provide an outcome that the application layer 140 compares against an allow state before any native request to location services 132. The determination may occur immediately after the dialog resolves and prior to any call through API(s) 136 to request coordinates. For example, the application layer 140 can branch to location acquisition only when the outcome equals granted and can skip location acquisition when the outcome equals denied. In some implementations, a denial outcome can cause the application layer 140 to record a denial event and bypass downstream steps for location, attestation, and packet assembly. For example, the communication engine 144 can emit a minimal response that identifies an aborted flow due to consent denial without invoking location services 132.

The method 500 can include ending the flow at step 510 when an application executing on the device 110 determines that a consent outcome denies authorization to access location at step 508. In some implementations, the termination can occur immediately after the consent decision and before any native request to location services 132 or any invocation of the attestation engine 134, so no location or attestation call is issued by the application. For example, a user interface presented by the application can display a message indicating that location sharing is needed and can return control to the initiating context without issuing any operating system service call. In some implementations, the control flow branch can exit to a completion state with no packet assembly by the communication engine 144 and no serialization of fields for transmission. For example, the application can omit generation of a payload and proceed directly to teardown of transient interaction elements. In some implementations, the communication engine 144 can transmit an optional status-only message to the authentication server 160 indicating that consent was not granted. For example, the communication engine 144 can send over Hypertext Transfer Protocol Secure via the communication device 150 a short JavaScript Object Notation body that carries a correlation token and a reason code identifying a consent-denied outcome.

Where, at step 508, the consent outcome authorizes location sharing, the method 500 can include transmitting a signal to a native operating system service to request location data at step 512. The application layer 140 can issue a first native application programming interface call through API(s) 136 to location services 132 to request current coordinates and an operating-system-generated acquisition time. In some implementations, the application layer 140 can perform the call after a consent outcome is received from the consent engine 148 and before any invocation of the attestation engine 134. For example, the application layer 140 can generate a single-shot request to location services 132 and await a callback completion prior to any signing operation. In some implementations, the call can specify accuracy and/or freshness parameters that cause location services 132 to return a timestamped fix within a validity window. For example, the application layer 140 can request latitude and longitude with meter-level accuracy and a maximum age threshold, for example by invoking a fused provider or a Core Location request, among others.

The application layer 140 can receive current location data at step 514. In some embodiments, the application layer 140 can receive the location data via a callback from the operating system layer 130 after issuing a request for coordinates to location services 132 through API(s) 136. The operating system layer 130 can source the location data from sensor(s) 126 of the device 110 and return the data to the application layer 140. In some implementations, the returned values can include coordinates obtained from a global positioning system receiver, a wireless personal area network transceiver, a wireless local area network transceiver, and/or a near-field communication interface. For example, the callback object can provide latitude and longitude derived from the global positioning system receiver and proximity-assisted coordinates inferred from wireless personal area network or wireless local area network observations. The receipt can occur after the operating system layer 130 resolves a requested location fix and within a challenge response window associated with an instance of the method 500. In some implementations, the application layer 140 can apply timeout logic that triggers a retry for the request to location services 132 or terminates the step/method 500 when the callback does not arrive within a threshold. The operating system layer 130 can attach a system timestamp that indicates an acquisition time for the coordinates. For example, the callback can include a millisecond-resolution timestamp generated by the operating system layer 130 together with the latitude and longitude for placement into packet fields.

The method 500 can include invoking an attestation service to obtain device integrity data at 516. An application executing in the application layer 140 can issue a second native request through API(s) 136 to an attestation engine 134 of the operating system layer 130 to obtain device integrity data indicative of operational components of the device 110 and to request a signature over selected inputs. In some implementations, the application layer 140 can perform the attestation request after current location data and an operating-system-generated timestamp are available from location services 132 so that the attestation engine 134 binds integrity outputs to location fields. For example, the application layer 140 can compute a canonical hash over latitude, longitude, and the operating-system-generated timestamp and pass the hash and a challenge nonce to the attestation engine 134 via API(s) 136 for inclusion in a signed envelope. In some implementations, the attestation engine 134 can return device integrity data that includes a debug status indicator, a mock location indicator, an installation source indicator, and/or an operating system or hardware modification indicator. For example, the attestation engine 134 can employ hardware-rooted keys maintained in a secure enclave or a trusted execution environment in the hardware layer 120 to produce an Elliptic Curve Digital Signature Algorithm signature over the payload hash and the challenge nonce. In some implementations, a platform attestation service (e.g., Play Integrity or DeviceCheck, etc.) can generate the signature and return the signature together with the device integrity data to the application layer 140 for packet assembly.

The method 500 can include generating a data packet at step 518. In some implementations, a communication engine 144 executing in an application layer 140 of a device 110 can generate the data packet at step 518. The communication engine 144 can assemble packet fields after attestation input fields are determined and before a signature request is issued to an attestation engine 134. The communication engine 144 can include in the data packet user authentication information, location data, device integrity data, and an operating-system-generated timestamp obtained from location services 132. In some implementations, the communication engine 144 can serialize the data packet as Concise Binary Object Representation or JavaScript Object Notation with deterministic field ordering. For example, the communication engine 144 can emit a byte sequence that places credential fields, geographic coordinates, integrity indicators, and the timestamp in a fixed schema. In some implementations, the communication engine 144 can add proximity information sourced from a paired device 190 via a wireless personal area network transceiver of sensor(s) 126 and/or a near-field communication interface of sensor(s) 126. For example, the communication engine 144 can include/incorporate WPAN received signal strength indication values and/or a near-field communication tag identifier into a proximity section within the data packet.

The method 500 can include generating a digital signature at step 520 by invoking an attestation engine 134 in response to a request issued by an application executing in the application layer 140. In some implementations, the attestation engine 134 can compute a signature that corresponds to location data and device integrity data assembled by a communication engine 144 into a canonical field order. For example, the application layer 140 can provide the attestation engine 134 with values over latitude, longitude, an operating-system-generated timestamp, and integrity indicators, and the attestation engine 134 can return an Elliptic Curve Digital Signature Algorithm signature value. In some implementations, the attestation engine 134 can bind additional user authentication information by hashing selected credential fields with a challenge nonce prior to signing. For example, the application layer 140 can concatenate a normalized credential value and the nonce with the canonicalized location subset and pass the resulting hash to the attestation engine 134 for signing. The signing can occur after packet canonicalization by the communication engine 144 and before transmission by a communication device 150. In some implementations, the attestation engine 134 can employ a hardware-backed private key anchored in a secure element of the hardware layer 120 or in a platform attestation authority to generate the signature. For example, a Secure Enclave or a StrongBox implementation in the hardware layer 120 can produce the signature over the provided payload hash.

The method 500 can include transmitting a response that includes the data packet 300 at step 522. The response can be transmitted to the authentication server 160 over a secure transport via the communication device 150. In some implementations, the application in the application layer 140 can post the signed payload as a Hypertext Transfer Protocol Secure request to an endpoint of the authentication server 160 within a challenge validity window. For example, the communication device 150 can send a body that carries the user authentication information and the digital signature after signature generation completes. In some implementations, the transmission can include an original nonce that binds the response to a corresponding challenge issued by the authentication server 160. For example, packets that omit the expected nonce can be rejected by the authentication server 160 before any policy evaluation occurs. In some implementations, the application in the application layer 140 can await an acknowledgment from the authentication server 160 and may clear sensitive buffers in memory 124 that hold credential values and temporary packet fields after the acknowledgment is received. For example, in-memory objects containing hashed credential values can be zeroed by the application in the application layer 140 once the authentication server 160 confirms receipt.

Figure 6:
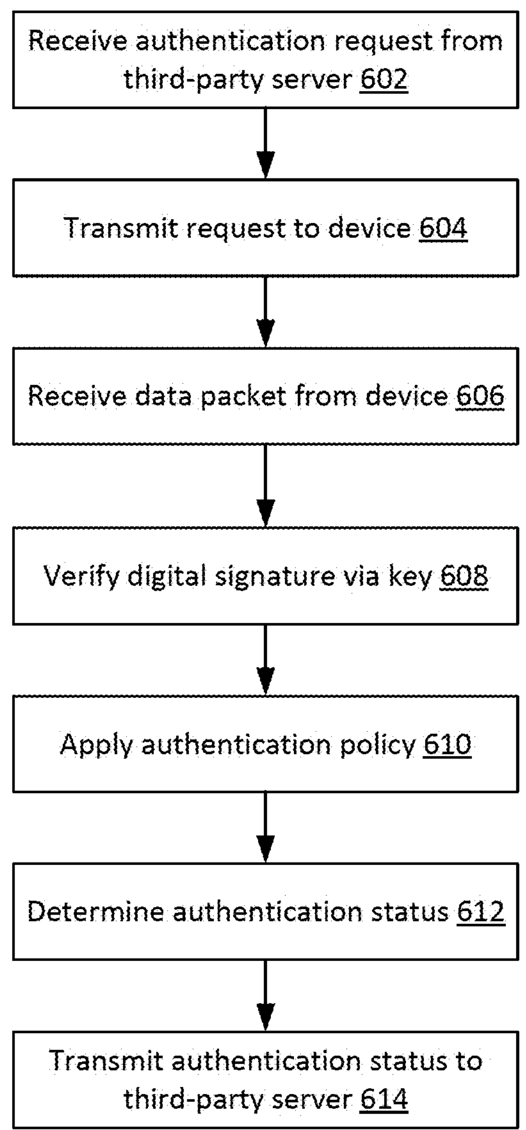
FIG. 6 is a flow chart illustrating a method for location-based user authentication at an authentication server, in accordance with one or more implementations.

Referring now to FIG. 6, illustrated is a method 600 of location-based user authentication executed at an authentication server. The method 600 can include receiving an authentication request from a third-party server (step 602), transmitting a request to a device (step 604), receiving a data packet from the device (step 606), verifying a digital signature using a cryptographic key (step 608), applying an authentication policy (step 610), determining an authentication status (step 612), and transmitting the authentication status to the third-party server (step 614).

The method 600 can include receiving an authentication request from the third-party server 180 at step 602. The authentication server 160 can accept the authentication request over a secure transport and identify parameters that trigger generation of a downstream challenge. In some implementations, the authentication server 160 can parse the authentication request to extract a correlation token, one or more requested context selectors such as attested location, and a response deadline. For example, the authentication server 160 can read a body that provides a user identifier and a relying-party resource identifier from the third-party server 180, and map those values to a target application instance for challenge delivery. In some implementations, the third-party server 180 can transmit the authentication request when a user attempts to access a protected resource hosted by the third-party server 180 or initiates an onboarding or high-risk transaction. For example, the third-party server 180 can POST an authentication ticket that carries the correlation token and the requested context selectors, and the authentication server 160 can register the response deadline for use when generating the challenge.

The method 600 can include transmitting a request to the device 110 at step 604. The authentication server 160 can send a challenge that instructs an application on the device 110 to gather user authentication information and attested context. In some implementations, the authentication server 160 can generate the challenge immediately after the authentication server 160 receives a request from the third-party server 180 and resolves routing data for a target application instance on the device 110. For example, the authentication server 160 can push a message to the device 110 or prompt the application on the device 110 to fetch a challenge body over Hypertext Transfer Protocol Secure within a validity window. In some implementations, the challenge generated by the authentication server 160 can specify a nonce, a correlation token, a timeout value, and a list of required packet fields that include location data, device integrity indicators, and an operating-system-generated timestamp. For example, the challenge payload sent by the authentication server 160 can embed the correlation token and the nonce that the application on the device 110 must echo and sign in a subsequent response.

The authentication server 160 can receive a data packet from the device at step 606. In some implementations, the data packet can carry user authentication information, location data with an operating-system-generated timestamp, device integrity data, and a digital signature generated by an attestation service. For example, the authentication server 160 can accept a JavaScript Object Notation or Concise Binary Object Representation object that encodes latitude and longitude, the operating-system-generated acquisition time, and integrity indicators such as debug status or mock location status. In some implementations, the receipt can occur within a response deadline associated with a previously issued challenge. For example, the authentication server 160 can mark a transaction expired and reject packets that arrive after the deadline. In some implementations, the authentication server 160 can validate basic formatting of the data packet and correlate the data packet using a correlation token and a nonce issued with the challenge. For example, the authentication server 160 can discard a data packet that omits the expected correlation token or the expected nonce prior to any cryptographic processing.

The authentication server 160 can verify a digital signature for a received data packet at step 608. In some implementations, a key management engine 172 can obtain a cryptographic verification key from public key storage or from device enrollment records. For example, the key management engine 172 can select an Elliptic Curve Digital Signature Algorithm P-256 public key associated with an attestation engine 134 or the device 110. The signature verification engine 168 can compute a digest over canonicalized fields and a challenge nonce, and apply Elliptic Curve Digital Signature Algorithm verification using the retrieved key. In some implementations, the canonicalized fields can include latitude, longitude, an operating-system-generated timestamp, and device integrity indicators. The authentication server 160 can execute the verification after correlation checks are satisfied and before any policy evaluation. Packets that fail verification or that present unacceptable integrity indicators can be rejected without location verification by the location verification engine 170.

The method 600 can include applying an authentication policy at step 610. The authentication server 160 may execute a policy evaluation engine 174 to apply an authentication policy with inputs produced after a successful outcome at a signature verification engine 168 and a location verification engine 170. In some implementations, the authentication server 160 can evaluate rule predicates that reference a verified signature status, attested geographic coordinates, and device integrity data delivered in the data packet 300. For example, the policy evaluation engine 174 can assert that a point-in-polygon result from the location verification engine 170 places the coordinates inside an allowed jurisdiction and that integrity indicators report no debug status, no mock provider, and an installation source equal to an official store. In some implementations, the authentication server 160 can evaluate proximity constraints that reference observations related to a paired device 190 received via a wireless personal area network transceiver, a wireless local area network transceiver, and/or a near-field communication interface. For example, the policy evaluation engine 174 can compare a received signal strength indication against a threshold and treat a value at or above the threshold as satisfying a workstation-access condition. In some implementations, the authentication server 160 can combine geofence and proximity outcomes into a decision vector using conjunction and/or disjunction parameters and emit a pass or fail outcome with one or more reason identifiers.

The method 600 can include determining an authentication status at step 612. The authentication server 160 may determine the authentication status using inputs derived from a data packet 300 and prior evaluations. The authentication server 160 can determine an authentication status of the user based on location data in the data packet 300, a verified digital signature, and user authentication information. In some implementations, the authentication server 160 can compute an allow status when the verified digital signature indicates authenticity, device integrity indicators are acceptable, and coordinates fall within an approved geographic region. In some implementations, the determination can occur after the policy evaluation engine 174 produces rule outcomes and before the authentication server 160 transmits a response to the third-party server 180. For example, when an attested mock-location indicator is present, the authentication server 160 can compute a deny status and attach a reason code that identifies the mock-location condition. The authentication server 160 can assemble a decision object that carries the computed status, identifiers of evaluated policy rules, and one or more timestamps. For example, the authentication server 160 can store a correlation token, a policy version identifier, and a decision outcome in the memory 164 as part of a transaction record.

The method 600 can include transmitting the authentication status to the third-party server 180 at step 614 based on a decision outcome. In some implementations, the authentication server 160 can generate a status message that conveys approval or denial (e.g., based on the determined authentication status at step 612) and/or one or more reason codes associated with results produced by policy evaluation. For example, the authentication server 160 can POST an allow or deny indicator with geofence and/or device-integrity flags to a callback endpoint supplied in the initial request from the third-party server 180. In some implementations, the authentication server 160 can transmit the status message after the decision outcome is computed and within a session window initiated by the third-party server 180. For example, the authentication server 160 can respond synchronously for an interactive login or asynchronously for a queued onboarding workflow. In some implementations, the authentication server 160 can apply a digital signature or a message authentication code to the status payload and include a correlation token that associates the response with the originating request. For example, the authentication server 160 can include the correlation token and a server-side signature in the status message to permit downstream verification by the third-party server 180 before access is granted.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

Elements described as negative elements can instead be configured as positive elements and elements described as positive elements can instead by configured as negative elements. For example, elements described as having first polarity can instead have a second polarity, and elements described as having a second polarity can instead have a first polarity. Further relative parallel, perpendicular, vertical or other positioning or orientation descriptions include variations within +/−10% or +/−10 degrees of pure vertical, parallel or perpendicular positioning. References to "approximately," "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

What is claimed is:

1. A method for authenticating a user, the method comprising:

receiving, at an application executing on one or more processors of a device, from an authentication server associated with the application, a request corresponding to authentication of a user to a third-party server;

obtaining, by the application from the user, user authentication information;

receiving, by the application responsive to consent from the user for location data and a signal transmitted to a native operating system (OS) service on the device, current location data of the device from a location sensor of the device;

invoking, by the application after receiving the current location data, an attestation service of the OS on the device, to obtain device integrity data indicative of one or more operational components of the device;

generating, by the application, a data packet including the user authentication information, the current location data, and a digital signature generated by the attestation service, the digital signature generated based on the current location data, and the device integrity data; and transmitting, by the application to the authentication server, a response comprising the data packet inclusive of the user authentication information, the current location data, and the digital signature, wherein the user authentication information, the current location data, and a verification of the digital signature is used to determine an authentication status of the user transmitted by the authentication server to the third-party server.

2. The method of claim 1, wherein the device integrity data comprises at least one of an indication of a device debug or mock mode status, an indication of whether the application was installed via a designated application store, or an indication of a hardware or OS modification.

3. The method of claim 1, wherein the signal transmitted to the native OS service comprises a first native application programming interface (API) call to a location service of the device, and wherein the attestation service of the OS on the device is invoked via a second native API call to the attestation service of the device.

4. The method of claim 1, further comprising:

rendering, by the device, a prompt to obtain consent to share the current location data, wherein the application receives the current location data responsive to obtaining consent via the prompt.

5. The method of claim 1, wherein the digital signature attests to the current location data, the device integrity data, and the user authentication information.

6. The method of claim 1, wherein the data packet further includes a timestamp, generated by the native operating system, indicating when the current location data was obtained.

7. The method of claim 1, wherein the current location data is obtained by the native OS service from at least one of a global positioning system (GPS) sensor, a wireless personal area network (WPAN) transceiver, a wireless local area network (WLAN) transceiver, or a near-field communication (NFC) transceiver.

8. The method of claim 7, further comprising:

receiving, by the application, via the WPAN transceiver, WLAN transceiver, or NFC transceiver, a signal from a paired device indicating proximity information of the device relative to the paired device, wherein the data packet further includes the proximity information.

9. The method of claim 8, wherein the paired device comprises at least one of a mobile phone, a tablet, or a wearable device.

10. An authentication server, comprising:

one or more processors; and memory storing instructions that, when executed by the one or more processors, cause the one or more processors to:

receive, from a third-party server, a request to trigger authentication of a user by the authentication server to the third-party server;

transmit, to an application executing on a device, a challenge to authenticate the user responsive to the request;

receive, from the application, a data packet comprising:

user authentication information obtained from the user via the application;

current location data of the device obtained by the application from a location sensor of the device responsive to (i) consent from the user for location data, and (ii) a signal transmitted by the application to a native operating system (OS) service of the device requesting the current location data;

device integrity data obtained by the application responsive to invoking an attestation service of the native OS after receiving the current location data; and a digital signature generated by the attestation service, the digital signature generated based on to the current location data and the device integrity data;

verify, using a cryptographic key associated with the attestation service or the device, the digital signature from the data packet;

determine an authentication status of the user, based on the user authentication information, the current location data, and the verified digital signature; and transmit, to the third-party server, a response to the request indicating the authentication status of the user.

11. The authentication server of claim 10, wherein the instructions cause the one or more processors to obtain the cryptographic key from at least one of the device or public key storage.

12. The authentication server of claim 10, wherein the instructions cause the one or more processors to determine the authentication status, based on the current location data from the data packet indicating a current location of the device is within a geographic region associated with the user authentication information.

13. A non-transitory computer readable medium storing instructions that, when executed by one or more processors, cause the one or more processors to execute an application on a device, the application configured to:

receive, from an authentication server associated with the application, a request corresponding to authentication of a user to a third-party server;

obtain, from the user, user authentication information;

receive, responsive to consent from the user for location data and a signal transmitted to a native operating system (OS) service on the device, current location data of the device from a location sensor of the device;

invoke, after receiving the current location data, an attestation service of the OS on the device, to obtain device integrity data indicative of one or more operational components of the device;

generate a data packet including the user authentication information, the current location data, and a digital signature generated by the attestation service, the digital signature generated based on the current location data, and the device integrity data; and transmit, via a transceiver to the authentication server, a response comprising the data packet inclusive of the user authentication information, the location data, and the digital signature, wherein the user authentication information, the current location data, and a verification of the digital signature is used to determine an authentication status of the user transmitted by the authentication server to the third-party server.

14. The non-transitory computer readable medium of claim 13, wherein the device integrity data comprises at least one of an indication of a device debug or mock mode status, an indication of whether the application was installed via a designated application store, or an indication of a hardware or OS modification.

15. The non-transitory computer readable medium of claim 13, wherein the signal transmitted to the native OS service comprises a first native application programming interface (API) call to a location service of the device, and wherein the attestation service of the OS on the device is invoked via a second native API call to the attestation service of the device.

16. The non-transitory computer readable medium of claim 13, wherein the instructions cause the application to:

render a prompt to obtain consent to share the current location data, wherein the application receives the current location data responsive to obtaining consent via the prompt.

17. The non-transitory computer readable medium of claim 13, wherein the digital signature attests to the current location data, the device integrity data, and the user authentication information.

18. The non-transitory computer readable medium of claim 13, wherein the data packet further includes a timestamp, generated by the native operating system, indicating when the current location data was obtained.

19. The non-transitory computer readable medium of claim 13, wherein the current location data is obtained by the native OS service from at least one of a global positioning system (GPS) sensor, a wireless personal area network (WPAN) transceiver, a wireless local area network (WLAN) transceiver, or a near-field communication (NFC) transceiver.

20. The non-transitory computer readable medium of claim 13, wherein the instructions further cause the application to:

receive, via the WPAN transceiver, WLAN transceiver, or NFC transceiver, a signal from a paired device indicating proximity information of the device relative to the paired device, wherein the data packet further includes the proximity information.

* * * * *